United States Patent
Rosenzweig et al.

(10) Patent No.: US 10,200,428 B1
(45) Date of Patent: Feb. 5, 2019

(54) UNICAST ROUTING OF A MEDIA STREAM TO SUBSCRIBERS

(71) Applicant: Amazon Technologies, Inc., Seattle, WA (US)

(72) Inventors: Jesse Jerome Rosenzweig, Portland, OR (US); Michael Reddick Coleman, Portland, OR (US); Dustin Encelewski, Happy Valley, OR (US); Stefan Christian Richter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 286 days.

(21) Appl. No.: 15/085,965

(22) Filed: Mar. 30, 2016

(51) Int. Cl.
   *H04L 29/08* (2006.01)
   *H04L 29/06* (2006.01)
   *H04L 12/24* (2006.01)
   *H04L 12/26* (2006.01)

(52) U.S. Cl.
   CPC ...... *H04L 65/4084* (2013.01); *H04L 41/0631* (2013.01); *H04L 43/16* (2013.01); *H04L 65/4015* (2013.01)

(58) Field of Classification Search
   CPC . H04L 12/185; H04L 29/06; H04L 29/06027; H04L 65/605; H04L 12/4625; H04L 65/4015
   USPC .................................................. 709/231, 219
   See application file for complete search history.

(56) References Cited

U.S. PATENT DOCUMENTS

| | | | |
|---|---|---|---|
| 7,191,244 B2 * | 3/2007 | Jennings | H04L 29/06 709/231 |
| 7,191,387 B1 | 3/2007 | Massoudi | |
| 7,337,231 B1 | 2/2008 | Li | |
| 7,707,300 B1 * | 4/2010 | Champagne | H04L 12/4625 709/231 |
| 7,925,738 B2 | 4/2011 | Tang | |
| 8,706,897 B2 * | 4/2014 | Wadhwa | H04L 47/15 370/390 |
| 8,792,347 B2 | 7/2014 | Swenson et al. | |
| 9,066,133 B2 | 6/2015 | Sharif-Ahmadi et al. | |
| 9,154,361 B2 | 10/2015 | Swenson et al. | |
| 2002/0136201 A1 * | 9/2002 | Buchsbaum | H04B 7/18597 370/352 |
| 2005/0076099 A1 * | 4/2005 | Wang | H04L 29/06027 709/219 |

(Continued)

OTHER PUBLICATIONS

U.S. Appl. No. 15/077,647, filed Mar. 22, 2016, Rosenzweig, et al.

(Continued)

*Primary Examiner* — Frantz Coby
(74) *Attorney, Agent, or Firm* — Robert C. Kowert; Meyertons, Hood, Kivlin, Kowert & Goetzel, P.C.

(57) ABSTRACT

Methods, systems, and computer-readable media for unicast routing of a media stream to subscribers are disclosed. A stream routing service is implemented using one or more computing devices that are provisioned from a multi-tenant provider network. The service acquires a media stream over one or more input channels from a media source. The service replicates the media stream to a plurality of subscriber components that have subscribed to the media stream. The media stream is replicated to the subscriber components using unicast transmission to individual addresses of the subscriber components.

20 Claims, 16 Drawing Sheets

(56) References Cited

U.S. PATENT DOCUMENTS

| | | | |
|---|---|---|---|
| 2006/0187950 A1* | 8/2006 | Bou-Diab | H04L 12/185 370/432 |
| 2006/0224757 A1* | 10/2006 | Fang | H04L 65/605 709/231 |
| 2007/0266170 A1* | 11/2007 | Mockett | H04N 21/4622 709/231 |
| 2008/0062990 A1* | 3/2008 | Oran | H04L 1/1607 370/392 |
| 2008/0225850 A1* | 9/2008 | Oran | H04L 65/608 370/392 |
| 2008/0285463 A1* | 11/2008 | Oran | H04L 65/80 370/241 |
| 2008/0307108 A1* | 12/2008 | Yan | H04L 65/1016 709/231 |
| 2009/0080328 A1* | 3/2009 | Hu | H04L 65/4084 370/230 |
| 2009/0083811 A1* | 3/2009 | Dolce | H04N 7/16 725/93 |
| 2011/0116492 A1* | 5/2011 | Byron | H04M 3/42221 370/352 |
| 2011/0164111 A1* | 7/2011 | Karaoguz | G06F 3/14 348/43 |
| 2011/0289544 A1* | 11/2011 | Goosen | H04N 21/4384 725/116 |
| 2011/0302319 A1* | 12/2011 | Ha | H04N 21/23439 709/231 |
| 2012/0233346 A1* | 9/2012 | Sang | H04L 65/4076 709/231 |
| 2013/0332856 A1* | 12/2013 | Sanders | G06F 3/0481 715/753 |

OTHER PUBLICATIONS

Digital Video Broadcasting (DVB); Measurement guidelines for DVB systems, ETSI Technical Report 101 290 V1.2.1, European Telecommunications Standards Institute, May 2001. Retrieved from: http://www.etsi.org/deliver/etsi_tr/101200_101299/101290/01.02_01_60/tr_101290v010201p.pdf, pp. 1-175.

Internet Group Management Protocol, Version 3, RFC 3376, The Internet Society, Oct. 2002. Retrieved from: https://tools.ietf.org/html/rfc3376, pp. 1-53.

Matthias Laabs, "SDI over IP—seamless signal switching in SMPTE 2022-6 and a novel multicast routing concept," European Broadcasting Union, Nov. 2012. Retrieved from: https://tech.ebu.ch/docs/techreview/trev_2012-Q4_SDI-over-IP_Laabs.pdf, pp. 1-7.

Wes Simpson, "SMPTE 2022 and the Future of Video Over IP," TV Technology, Jul. 2013. Retrieved from: http://www.tvtechnology.com/insight/0083/smpte--and-the-future-of-video-over-ip/220188, pp. 1-6.

* cited by examiner

UNICAST ROUTING OF A MEDIA STREAM TO SUBSCRIBERS

BACKGROUND

Internet-based video streaming is increasingly the choice of viewers who seek convenient access to video outside of conventional video distribution channels (including over-the-air broadcasts, cable TV, satellite TV, and prerecorded physical media). Using streaming technologies, viewers may access channels of live video as well as prerecorded video from libraries of video assets that are accessible over an Internet connection. In some cases, streaming video is viewable on a wide range of devices, including desktop computers and laptop computers, tablets, smartphones, wearable computers, and specialized devices such as smart televisions. The flexibility and convenience of streaming video are responsible in part for its widespread adoption.

The distribution and delivery pipeline for streaming video is typically a complicated one. A video asset or live stream may first be acquired, e.g., from a broadcaster. The video may then be processed and transformed in any of several ways (potentially including compression, encryption, and other forms of encoding) for eventual distribution to viewers. A hierarchy of servers over a wide geographical area may be used to deliver the video to many viewers in an efficient manner. The viewer may then attempt to play the video on a viewing device. When portions of the pipeline are implemented in an environment that permits multicast transmission, the same packet(s) may be sent to a multicast destination address for simultaneous transmission to a group of components. However, some computing environments may not permit multicast transmission, e.g., for security reasons.

Figure 1:
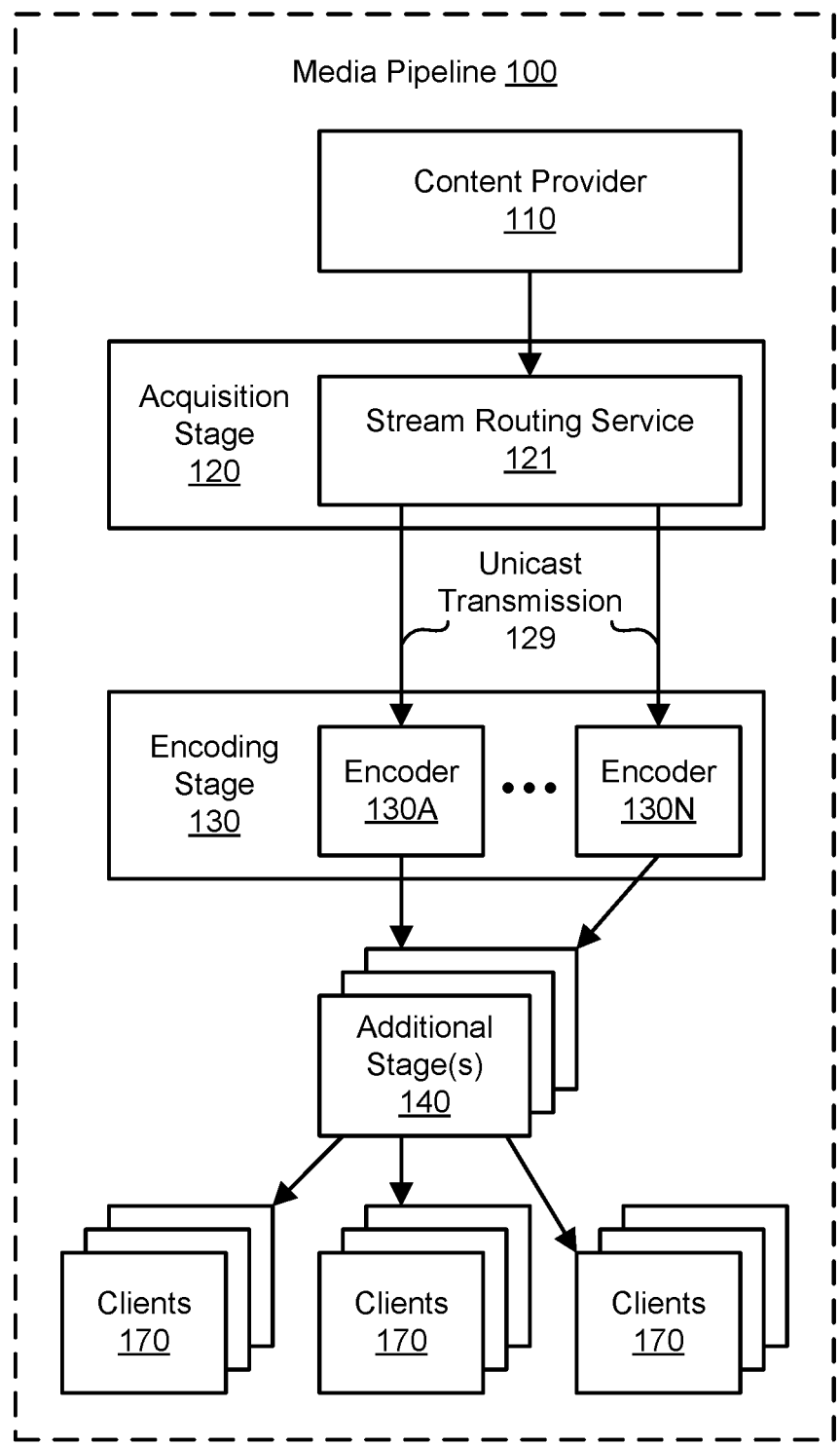
FIG. 1 illustrates an example system environment for unicast routing of a media stream to subscribers, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for unicast routing of a media stream to subscribers are described. Using the techniques described herein, a stream routing service may be implemented using computing resources of a multi-tenant provider network. The stream routing service is part of a delivery pipeline for streaming media, and other components of the pipeline may also be implemented using resources of the multi-tenant provider network. Multicast transmission may not be permitted between the pipeline components in the multi-tenant provider network for security reasons, e.g., to protect boundaries between different clients of the provider network. Multicast transmission typically involves sending the same packet to a single group address of multiple recipients, while unicast transmission typically involves sending multiple copies of the same packet to individual addresses of individual recipients. Components of the pipeline such as encoders, media analyzers, storage components, and other downstream components of the pipeline may subscribe to particular streams using the stream routing service. When the stream routing service acquires a media stream, often over redundant input channels (e.g., satellite, terrestrial, and so on) from a media source (e.g., a content provider of live video or pre-recorded video), the service may replicate that stream to any subscribers using unicast transmission techniques. In one embodiment, the service may individually and separately send data associated with the stream to individual addresses associated with the subscriber components. Replication to a component may be discontinued when the component unsubscribes to the stream or when the component cannot be contacted. Redundant instances of the stream routing service may be used to route the same stream. The stream routing service may also perform various other tasks, such as monitoring the quality of the stream, alerting when quality problems are detected, selecting one input channel for replication based on the relative quality of multiple input channels, error correction, encryption, decryption, and/or conversion of a multiple program transport stream (MPTS) to a single program transport stream (SPTS). In this manner, the stream routing service may provide efficient and flexible routing and processing of streaming media in an environment that prohibits multicast transmission.

Unicast Routing of a Media Stream to Subscribers

FIG. 1 illustrates an example system environment for unicast routing of a media stream to subscribers, according to one embodiment. A media streaming system may implement a media delivery pipeline 100 to stream media, such as video or audio, to client computing devices 170 for playback on those devices. The media may represent live media content (e.g., a live stream associated with a particular channel) or prerecorded media content (e.g., a media asset from a library of streamable media). The pipeline 100 may include multiple stages; the stages may represent various transformations of the media and/or various distribution paths for the media (e.g., from device to device over the internet).

The client computing devices 170 may be associated with and/or operated by one or more clients of the media streaming system; as used herein, the terms "client computing device," "client device," and "client" may be used interchangeably. The client computing devices 170 may be coupled to portions of the media streaming system via one or more networks, potentially including the Internet. A client may represent a customer (e.g., an individual or group entity) of the media streaming system. Typically, a user associated with one of the client computing devices 170 may have an account that has privileges to access media content provided by the media streaming system. The access may be fee-based or may instead be free to the user (potentially with advertisements in the streaming media or player software). However, some media may also be streamable to users without accounts or other arrangements, e.g., on websites that provide streaming video.

Figure 8:
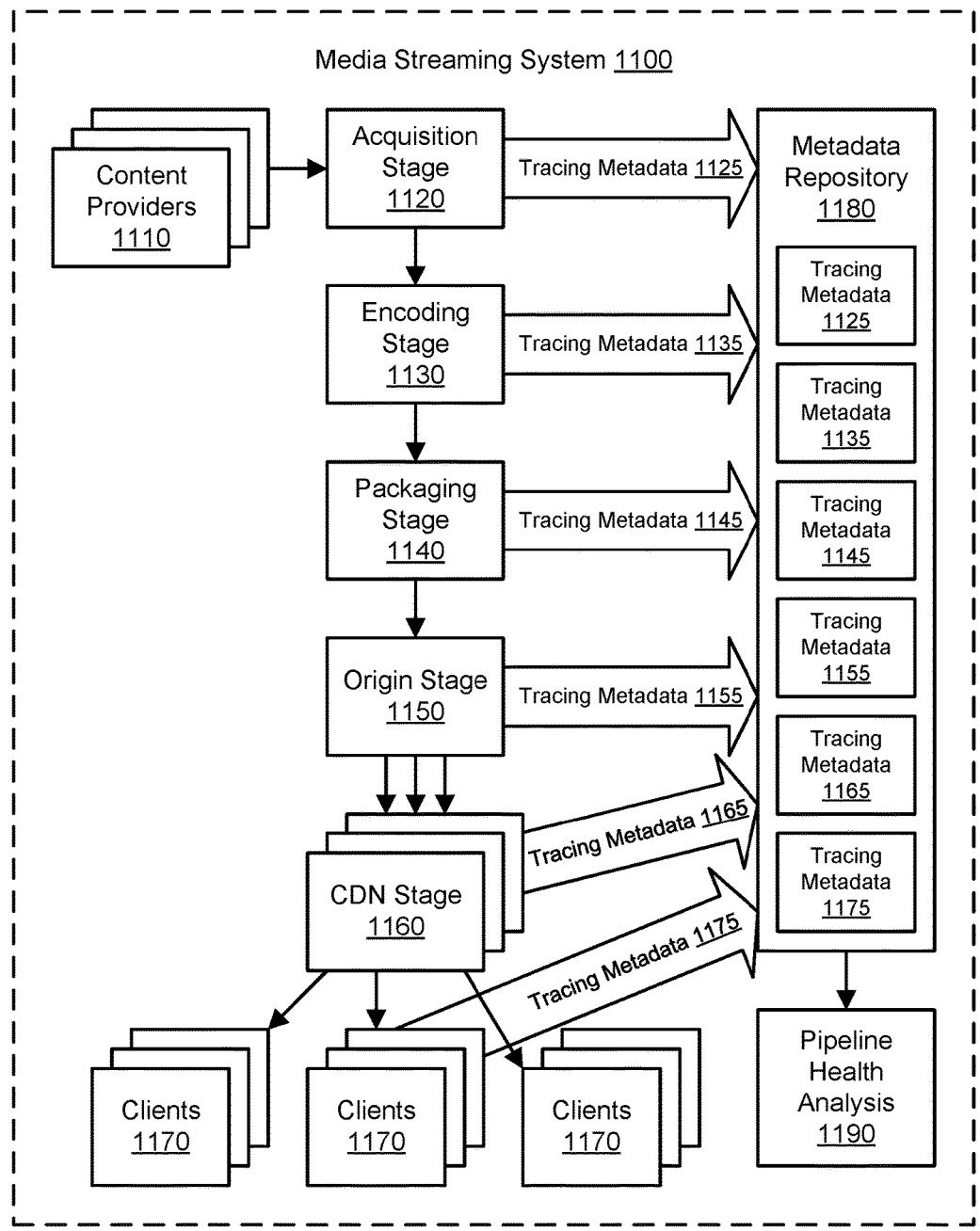
FIG. 8 illustrates an example system environment for monitoring of media pipeline health using tracing, according to one embodiment.

It is contemplated that the media pipeline 100 implemented by the media streaming system may include various combinations of stages, including the particular combination illustrated in FIG. 1 or another particular combination illustrated in FIG. 8. In one embodiment, as shown in FIG. 1, the stages of the pipeline may include an acquisition stage 120, an encoding stage 130, one or more additional stages 140, and potentially a distinct playback stage performed on the clients 170. As illustrated in FIG. 8, the additional stage(s) may include a packaging stage, an origin server stage, and a content delivery network (CDN) stage.

At the acquisition stage 120, a signal representing the media may be acquired from one or more content providers (also referred to herein as media sources) 110, e.g., broadcasters. The signal may be acquired by the acquisition stage 120 using any of several suitable transport mechanisms, including a camera feed, a microphone feed, an internet protocol (IP) connection, an asynchronous serial interface (ASI) connection, and so on. A stream routing service 121 may be implemented in the acquisition stage 120 to acquire content from one or more media sources and deliver it to the encoding stage 130. The stream routing service 121 may implement or represent a router and/or a reflector for streaming media. Multiple instances of the stream routing service 121 may be used for redundant routing of the same stream. A single instance of the stream routing service 121 may be used for routing of multiple steams simultaneously. Further details of the stream routing service are discussed with reference to FIG. 5. Further components of the acquisition stage 120 are discussed with reference to FIG. 11, including components such as a reflector that may be implemented using the stream routing service 121.

At the encoding stage 130, the media may be transformed into a particular video or audio format, e.g., using a particular codec. The encoding stage may be implemented by a plurality of components 130A-130N, referred to herein as encoders, that may operate in parallel. The encoders 130A-130N may differ in terms of the encoding tasks they perform. The encoders 130A-130N may also include redundant instances of the same type of encoder, and the redundant instances may subscribe to the same media stream from the stream routing service 121 to provide redundancy in the pipeline 100. The encoding stage 130 may include compression, or a separate compression stage may be used in the pipeline. Additionally, at the encoding stage 130, the media may be divided into segments or chunks of a fixed or variable size. For example, the media may be divided into segments of approximately ten seconds in length for delivery via HTTP over TCP/IP.

As described herein, components such as encoders 130A-130N may subscribe to particular media streams using the stream routing service 121. Subscriptions to a particular media stream may be configured using the particular instance of the stream routing service 121 that is handling the particular media stream. The subscriber components may include one or more encoders 130A-130N in the media pipeline 100 that seek to receive the particular media stream and perform encoding tasks (potentially including compression, segmentation, and so on) on the stream before passing the encoded stream to another stage of the pipeline. The subscriber components may also include one or more components of other stages in the media pipeline or potentially components outside of the media pipeline, e.g., components responsible for storing or analyzing the media stream. In one embodiment, requests to subscribe to a media stream may be received by an application programming interface (API) associated with the stream routing service 121. The requests to subscribe may be received from a coordination service (external to the stream routing service 121) or component or from the subscriber components themselves.

A request to subscribe may include any suitable data or metadata, such as an identifier of the particular media stream and an individual address (e.g., IP address) of the subscriber to which the stream should be directed by the stream routing service. The identifier of the media stream may be a content identifier that is globally unique within some context, e.g., within a media streaming system that includes multiple instances of the stream routing service 121. For example, if the media represents a live video stream, then the content identifier may indicate a particular channel. As another example, if the media represents prerecorded media content, then the content identifier may indicate a particular media asset from a library of media. In some embodiments, the request to subscribe may also indicate a starting time and/or ending time for the subscription or may instead indicate that the subscription should start upon receipt and continue indefinitely. In some embodiments, the request to subscribe may include access credentials, e.g., for a stream whose access is restricted.

For a media stream that has one or more subscribers, the stream routing service 121 may acquire elements of the media stream over one or more input channels from a media source represented by the content provider 110. The elements may correspond to packets or other units of data as transmitted over the input channel(s) and may be part of an ordered sequence of such elements. In one embodiment, a segment identifier associated with each element may indicate the relative position in the sequence. Multiple input channels may be used from the same content provider 110 to the same instance of the stream routing service 121 for redundancy. In one embodiment, the input channels may differ in some capacity, e.g., by using two or more Internet service providers (ISPs) to send the media stream from the media source to the stream routing service using parallel pathways. As an example, the multiple input channels may include a satellite-based pathway and a terrestrial pathway. The input channel(s) may use any suitable protocol, such as UDP and/or TCP over IP. In one embodiment, redundant instances of the stream routing service 121 may also be used to acquire the elements of the media stream. Any of the redundant instances of the stream routing service 121 may also use redundant, parallel pathways to acquire the media stream.

Elements of the media stream may be replicated to the subscriber components such as the encoders 130A-130N. The stream routing service 121 may use unicast transmission techniques 129 (rather than multicast transmission techniques) to send the elements of the stream to each of the subscribers on an individual basis. To replicate the elements, the stream routing service 121 may generate one or more packets or other units of data that include the element(s) (potentially after being processed or transformed by the stream routing service) in a form that is transmissible to the subscriber components. The stream routing service 121 may individually address the packet(s) or unit(s) to each of the subscriber components, e.g., such that each element of the media stream is not sent once to a group address but sent separately and in parallel to individual addresses of the subscriber components.

A subscriber component may be detached from the stream when the component fails, when the component is switched with another component or when the pipeline is otherwise reconfigured, when the media stream is no longer sought to be transmitted through that particular part of the pipeline (e.g., due to a diminished demand from viewers), or for any other suitable reason. In one embodiment, a component may be unsubscribed based (at least in part) on an explicit request to unsubscribe. In one embodiment, requests to unsubscribe to a media stream may be received by an API associated with the stream routing service 121 (e.g., by the particular instance of the stream routing service that is handling the particular media stream). The requests to unsubscribe may be received from a coordination service (external to the stream routing service 121) or component or from the subscriber components themselves. A request to unsubscribe may include any suitable data or metadata, such as an identifier of the particular media stream and an individual address (e.g., IP address) or other identifier of the subscriber.

In some embodiments, the request to unsubscribe may also indicate an ending time for the subscription or may instead indicate that the subscription should cease upon receipt. In one embodiment, a component may be unsubscribed based (at least in part) on an automatic determination by the stream routing service 121. For example, if packets or units of data are deemed to be undeliverable to an address associated with a particular subscriber, or if receipt of the packets is not acknowledged as expected, then the stream routing service 121 may automatically unsubscribe that component. Replication of the media stream may be discontinued to any of the subscriber components that have unsubscribed from the stream.

In the additional stage(s) 140, the media may be packaged and multiplexed (or "muxed") for playback on particular playback software (referred to herein as a "player") and/or a particular type of client device (e.g., a particular category of smartphone). In one embodiment, the additional stage(s) 140 may perform additional transformations of the media, such as encryption performed at an encryption stage, decoding performed at a decoding stage, framerate conversion performed at a framerate conversion stage, scaling performed at a scaling stage, advertisement insertion performed at an advertisement insertion stage, and/or other types of image processing (e.g., color transformation) performed at an image processing stage. Alternatively, one of the additional transformations may be performed as a sub-stage of another stage such as the encoding stage 130.

In one embodiment, the additional stage(s) 140 may include an origin server stage (also referred to as an origin stage) and a content delivery network (CDN) stage. The pipeline 100 may include one or more origin servers and a larger number of CDN servers. The origin server(s) may act as distribution points to the CDN servers. The CDN servers may be located closer to clients in terms of geography and/or network latency in order to provide efficient distribution of the media. A single origin server may provide a media stream to many CDN servers, and each CDN server may then respond to requests for media from many client devices. In some cases, such as for prerecorded media, the origin server may persistently store the media (or segments thereof) for an indefinite period of time, while the CDN servers may cache segments of the media for a more limited period of time. If a client requests particular content that is not available in the cache at a CDN server, then the CDN server may request the content from the origin server and then deliver the content to the requesting client. At the origin server stage, the media may be sent from the origin server to one or more CDN servers. If other stages such as the acquisition stage 120, encoding stage 130, and/or other stages 140 are performed at the origin server, then the origin stage may include those stages or include corresponding sub-stages. However, it is also contemplated that the origin server stage may represent a distinct stage relative to the acquisition stage 120, encoding stage 130, and/or other stages 140. At the CDN stage, the media may be sent from a CDN server to a client device 170, e.g., as requested by the client device. In one embodiment, the stages may also include a playback stage that represents attempted playback by a player (e.g., implemented in player software) on a client device 170.

In some embodiments, components of the media streaming system or pipeline 100 such as servers, storage resources, and network resources may be implemented using resources of a provider network. The provider network may be set up by an entity such as a company or a public sector organization to provide one or more services (such as various types of cloud-based computing or storage) accessible via the Internet and/or other networks to clients. The provider network may include numerous data centers hosting various resource pools, such as collections of physical and/or virtualized computer servers, storage devices, networking equipment and the like (e.g., implemented using the example computing system 3000 described below with regard to FIG. 16), needed to implement and distribute the infrastructure and services offered by the provider network. In some embodiments, the provider network may provide computing resources and services, such as services associated with the media streaming system; storage services, such as a block-based storage service, key-value based data stores, or various types of database systems; and/or any other type of network-based services. Clients may access these various services offered by provider network via one or more networks, potentially including the Internet. Likewise, network-based services may themselves communicate and/or make use of one another to provide different services. For example, computing resources offered in units called "instances," such as virtual or physical compute instances or storage instances, may make use of particular data volumes, providing virtual block storage for the compute instances.

The provider network may implement or provide a multi-tenant environment such that multiple clients (e.g., content providers 110 and/or end user clients 170 as well as other entities) may access or use a particular resource or service in a substantially simultaneous manner. Functionality of the media streaming system and pipeline 100, such as the stream routing service 121 and/or encoders 130A-130N, may be offered to multiple clients (in a substantially simultaneous manner) in such a multi-tenant provider network, such that the same computational and storage resources associated with the media streaming system and pipeline 100 may be used on behalf of different clients over the same window of time. The different clients may represent different individuals and/or different organizations that may pay the provider network for access to one or more services and/or resources. The provider network may include a fleet of computing devices, also referred to herein as servers, hosts, or instances, which are configured to execute software on behalf of clients of the provider network. In one embodiment, a fleet of servers may grow or shrink as individual servers are provisioned or deprovisioned using resources of the provider network. In one embodiment, the fleet of servers may grow or shrink as individual servers are added to or removed from a dedicated fleet by an administrator.

The content providers may be individuals or entities who provide streaming media content to the acquisition stage 120 for potential delivery to the clients 170. The content provider 110 as illustrated in FIG. 1 may correspond to one or more computing devices that are connected to the stream routing service 121 over one or more networks, potentially including the Internet. The computing devices associated with the content providers may encompass any type of hardware and software that are configurable to submit requests to the media streaming system (e.g., implemented using the example computing system 3000 described below with regard to FIG. 16). Similarly, the computing devices associated with the clients 170 may encompass any type of hardware and software that are configurable to consume streaming media provided by the media streaming system (e.g., implemented using the example computing system 3000 described below with regard to FIG. 16). For example, a client computing device may include a dedicated media player, a suitable version of a web browser, and/or a plug-in module or other type of code module configured to execute as an extension to or within an execution environment provided by a web browser or other form of client software. In some embodiments, such a client application may include sufficient protocol support (e.g., for a suitable version of Hypertext Transfer Protocol [HTTP]) for generating and processing network-based service requests.

Content provider 110 and/or client computing devices 170 may convey network-based requests to the media streaming system via one or more external networks. In various embodiments, the external network(s) may encompass any suitable combination of networking hardware and protocols necessary to establish network-based communications between computing devices and the media streaming system. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given computing device and the media streaming system may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given computing device and the Internet as well as between the Internet and the media streaming system. It is noted that in some embodiments, computing devices for the content provider 110 and/or clients 170 may communicate with the media streaming system using a private network in addition to or instead of the public Internet.

Figure 16:
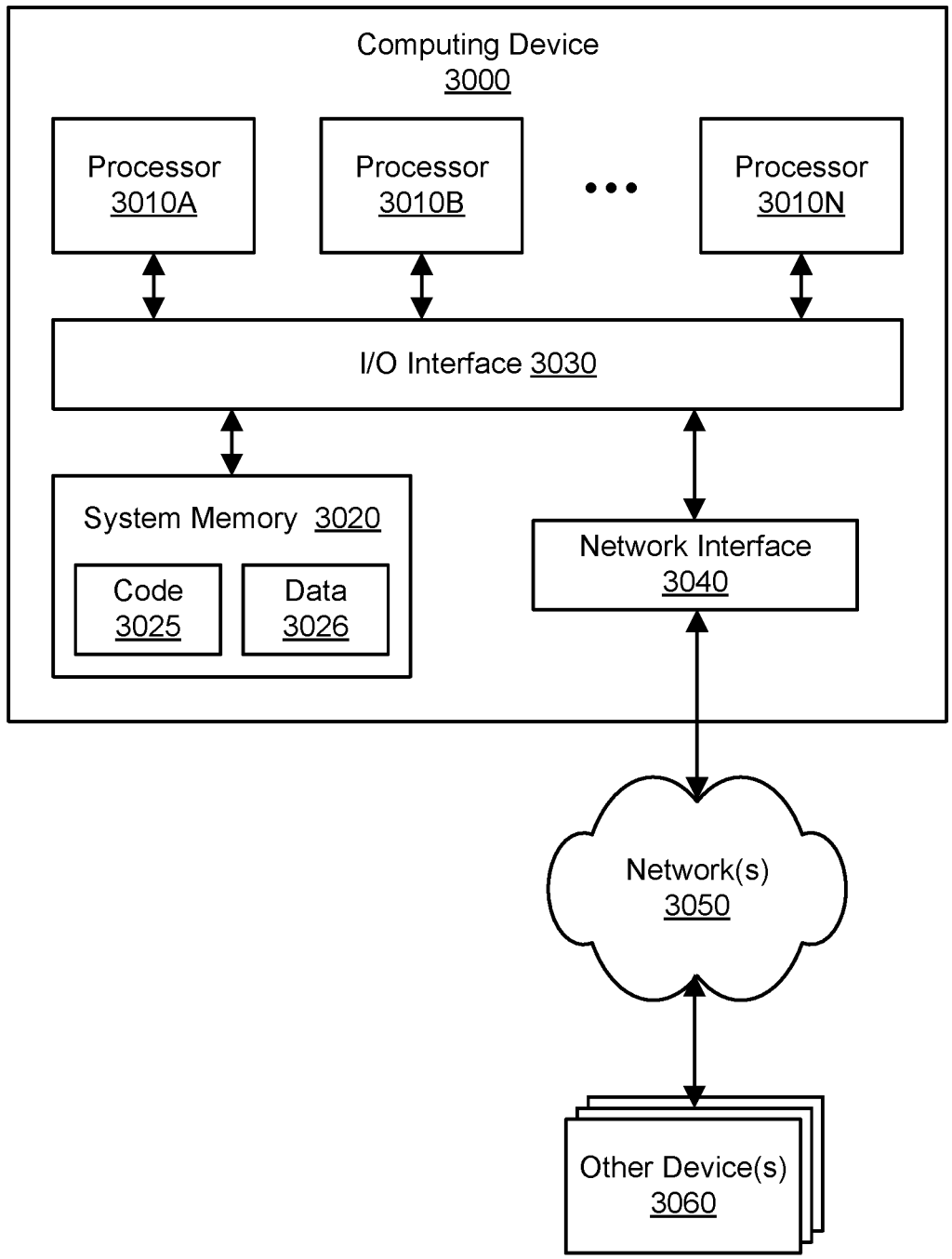
FIG. 16 illustrates an example computing device that may be used in some embodiments.

The media pipeline 100 may include a plurality of computing devices, any of which may be implemented by the example computing device 3000 illustrated in FIG. 16. In various embodiments, portions of the described functionality of the media pipeline 100 may be provided by the same computing device or by any suitable number of different computing devices. If any of the components of the media pipeline 100 are implemented using different computing devices, then the components and their respective computing devices may be communicatively coupled, e.g., via a network. Each of the illustrated components (such as the stream routing service 121 and encoders 130A-130N) may represent any combination of software and hardware usable to perform their respective functions. Multiple computing devices may typically be used to implement the multi-stage pipeline. In some circumstances, more than one stage may be performed by the same computing device.

It is contemplated that the media pipeline 100 may include additional components not shown, fewer components than shown, or different combinations, configurations, or quantities of the components shown. For example, although various stages such as stages 120, 130, and 140 are shown for purposes of example and illustration, it is contemplated that different quantities and configurations of stages may be used. Additionally, it is contemplated that some of the stages 120, 130, and 140 may include redundant components that collectively provide the functionality of the particular stage. Aspects of the functionality described herein may be performed, at least in part, by components outside of the pipeline 100.

Figure 2:
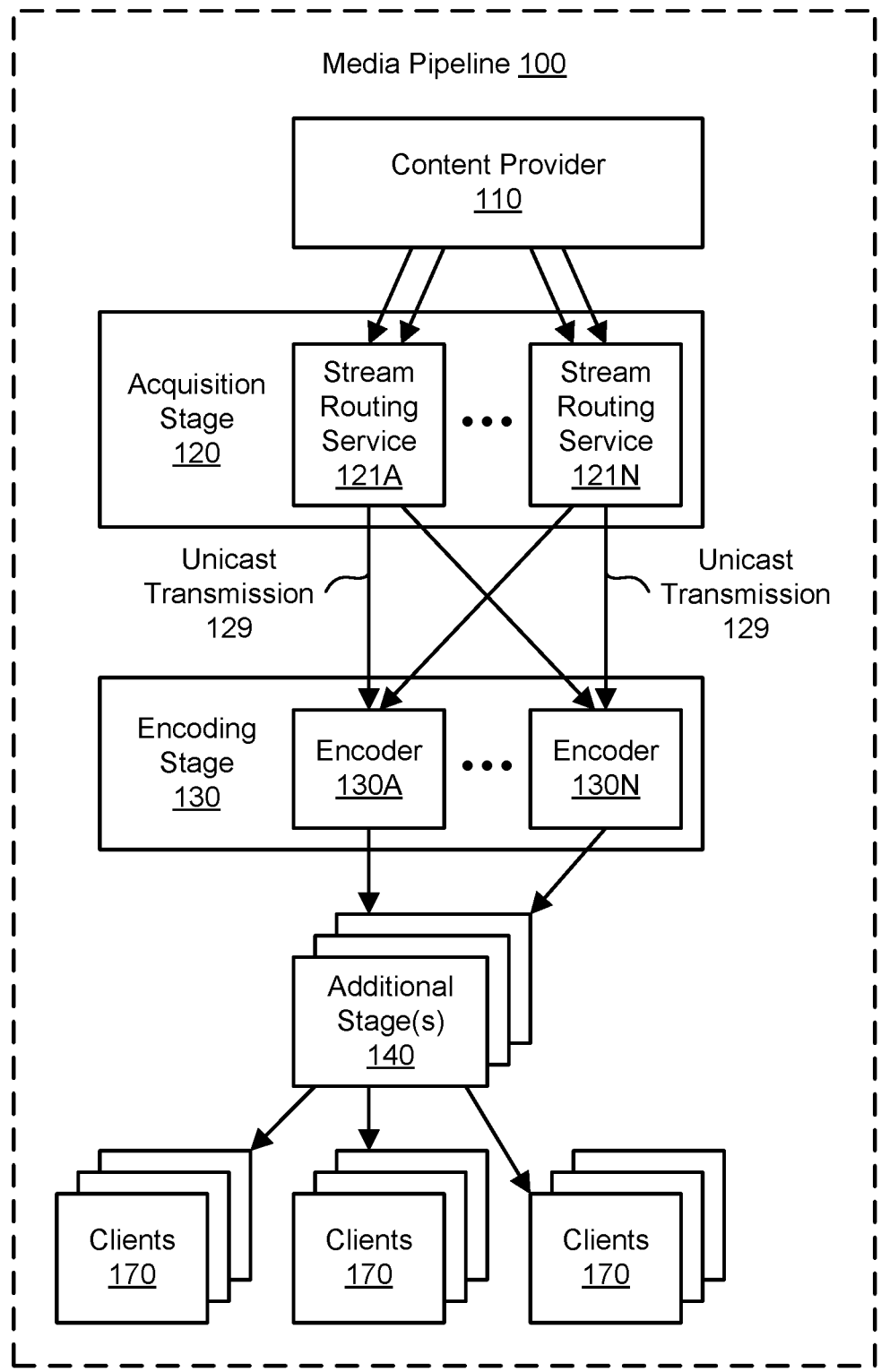
FIG. 2 illustrates further aspects of the example system environment for unicast routing of a media stream to subscribers, including redundant instances of the stream routing service and redundant input channels, according to one embodiment.

FIG. 2 illustrates further aspects of the example system environment for unicast routing of a media stream to subscribers, including redundant instances of the stream routing service and redundant input channels, according to one embodiment. As shown in the example of FIG. 2, multiple input channels may be used from the same content provider 110 to the same instance of the stream routing service 121 for redundancy. In one embodiment, the input channels may differ in some capacity, e.g., by using two or more Internet service providers (ISPs) to send the media stream from the media source to the stream routing service using parallel pathways. The input channel(s) may use any suitable protocol, such as UDP and/or TCP. In one embodiment, redundant instances of the stream routing service 121 may also be used to acquire the elements of the media stream. As shown in the example of FIG. 2, instances 121A-121N of the stream routing service may operate in parallel to route the same media stream from the same content provider 110. The instances 121A-121N may also route other media streams from the same content provider 110 or other content providers. In one embodiment, different instances 121A-121N may route different media streams. The different instances 121A-121N may be implemented using different compute instances and may potentially be located in different data centers or other geographical zones. If one of the instances 121A-121N fails or is taken offline, then one or more of the remaining instances may resume routing any media streams that were previously routed by that instance to any subscribers. Any of the redundant instances of the stream routing service 121 may also use redundant, parallel pathways to acquire the media stream, as shown in FIG. 2.

As shown in the example of FIG. 2, redundant instances 121A-121N of the stream routing service may route the same media stream to the same subscribers 130A-130N. Elements of the media stream may be replicated by the instances 121A-121N to the subscriber components such as the encoders 130A-130N. The stream routing service instances 121A-121N may use the unicast transmission techniques 129 (rather than multicast transmission techniques) to send the elements of the stream to each of the subscribers on an individual basis. To replicate the elements, the stream routing service instances 121A-121N may generate one or more packets or other units of data that include the element(s) (potentially after being processed or transformed by the stream routing service) in a form that is transmissible to the subscriber components. The stream routing service instances 121A-121N may individually address the packet(s) or unit(s) to each of the subscriber components, e.g., such that each element of the media stream is not sent once to a group address but sent separately and in parallel to individual addresses of the subscriber components. In one embodiment, the encoders 130A-130N may use deduplication techniques on redundant streams routed by redundant instances 121A-121N of the stream routing service, such that the encoders may discard redundant packets or other units of data in the streams. To determine redundant packets, the encoders may examine the metadata of the streams (e.g., the content identifiers and segment or sequence identifiers) or examine the data in the stream itself.

Figure 3:
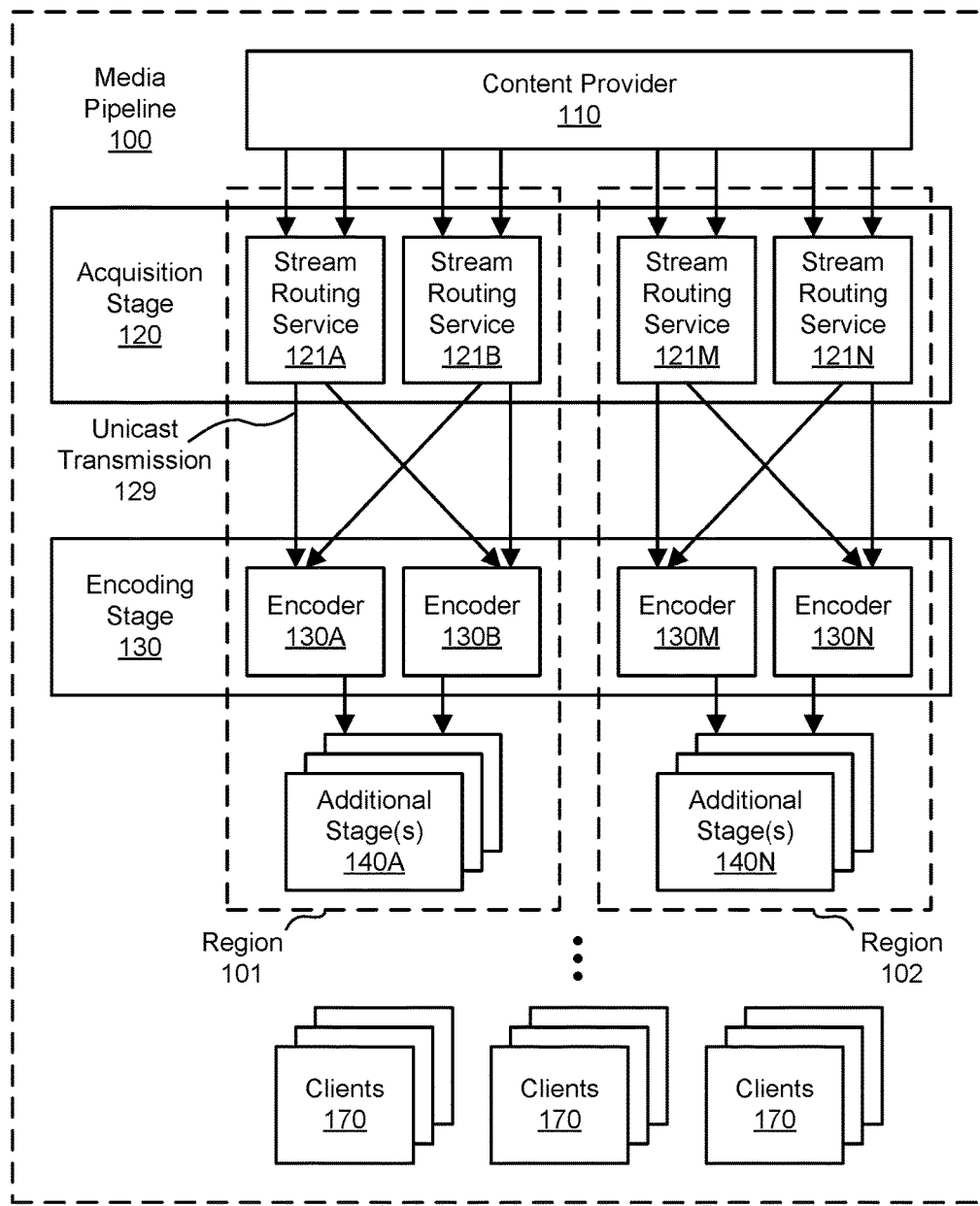
FIG. 3 illustrates further aspects of the example system environment for unicast routing of a media stream to subscribers, including redundant pipeline components in multiple regions, according to one embodiment.

FIG. 3 illustrates further aspects of the example system environment for unicast routing of a media stream to subscribers, including redundant pipeline components in multiple regions, according to one embodiment. Some of the pipeline stages may include redundant components that collectively provide the functionality of the particular stage. The redundancy of components in the same stage may permit the pipeline to be rerouted to bypass a problematic component in that stage or a component that is taken offline. As shown in the example of FIG. 3, the media pipeline 100 may also be divided into multiple regions such as region 101 and region 102. The different regions 101 and 102 may represent different zones within a provider network whose resources are used to implement the media pipeline 100. The different regions 101 and 102 may represent geographical divisions of underlying components, including different nations, states or political subdivisions, continents, arbitrary zones, or data centers.

Each of the regions 101 and 102 may implement a media delivery pipeline with multiple stages. Within each region, a particular stage may be implemented with redundancy. For example, multiple components operating in parallel may implement the acquisition stage 120, the encoding stage 130, and one or more of the additional stages 140 within each region. As shown in the example of FIG. 3, each region may include two instances of the stream routing service and two encoders for any given media stream from a content provider 110. The regions 101 and 102 may also include additional instances of the stream routing service and/or additional encoders, e.g., for other media streams. In region 101, redundant stream routing service instances 121A and 121B may route a media stream in parallel to redundant encoders 130A and 130B which may then provide the encoded stream to one or more additional stages 140A (at least some of which may also have redundant components operating in parallel). Similarly, in region 102, redundant stream routing service instances 121M and 121N may route the same media stream in parallel to redundant encoders 130M and 130N which may then provide the encoded stream to one or more additional stages 140N (at least some of which may also have redundant components operating in parallel). As discussed above with respect to FIG. 2, any of the instances 121A-121N of the stream routing service 121 may also use redundant, parallel pathways to acquire the media stream from the content provider 110. Additionally, the stream routing service instances 121A-121N may use the unicast transmission techniques 129 (rather than multicast transmission techniques) to send the elements of the stream to each of the subscribers on an individual basis. In various embodiments, a particular one of the clients 170 may be served by the pipeline components in both regions 101 and 102, or a particular client may be restricted to one of the regions.

Figure 4:
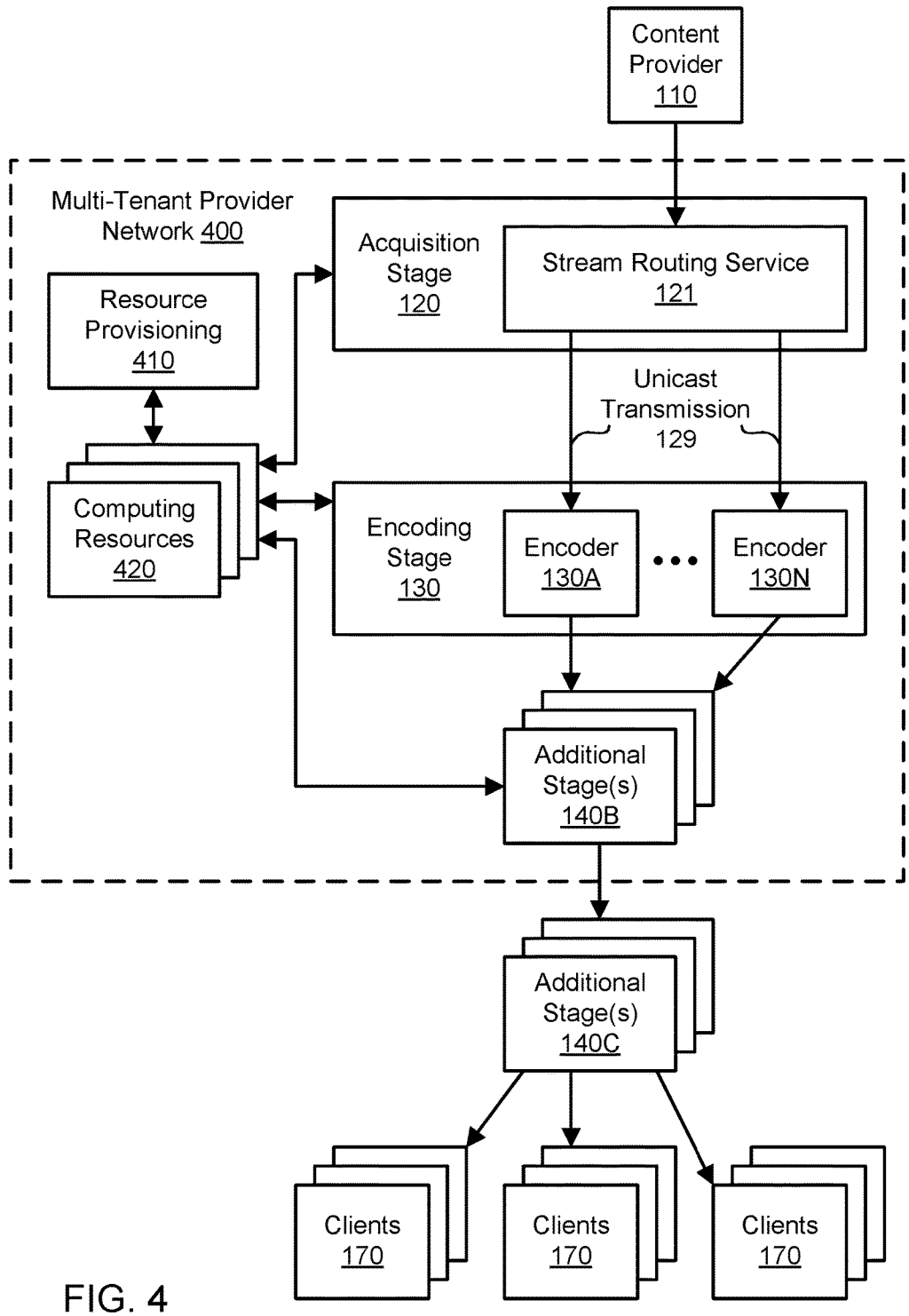
FIG. 4 illustrates further aspects of the example system environment for unicast routing of a media stream to subscribers, including the implementation of the stream routing service and pipeline components using computing resources provisioned from a multi-tenant provider network, according to one embodiment.

FIG. 4 illustrates further aspects of the example system environment for unicast routing of a media stream to subscribers, including the implementation of the stream routing service and pipeline components using computing resources provisioned from a multi-tenant provider network, according to one embodiment. As discussed above with respect to FIG. 1, the stream routing service 121 may be implemented using one or more computing resources, such as virtual compute instances or physical compute instances, that are provisioned from a provider network 400. In one embodiment, each instance of the stream routing service may be implemented using a different compute instance. The provider network 400 may offer multi-tenancy such that computing resources from a pool 420 may be shared by multiple clients of the provider network at any given time. In one embodiment, multicast transmission over network connections between components (e.g., compute instances with network adapters) may be prohibited within the provider network 400 due to the multi-tenancy.

The computing resources may include compute instances, storage instances, database instances, and so on. A resource provisioning functionality 410 in the multi-tenant provider network 400 may provision and deprovision resources in the pool 420 on behalf of clients. A computing resource from the pool 420 may be provisioned by selecting any appropriate type of resource, making it available to a particular client at a particular time, and potentially configuring the resource (e.g., with operating system software for a compute instance) to meet the requirements of the client. The client may then operate the provisioned resource based on the client's agreement with the provider network, e.g., on an hourly basis for a fee. When a resource is deprovisioned and returned to the pool 420 of available resources, another client may then provision and use that resource.

Additional components of the pipeline, such as encoders 130A-130N that subscribe to streams using the stream routing service 121, may also be provisioned using resources of the provider network. As shown in the example of FIG. 4, one or more additional pipeline stages 140B may be implemented using the resources of the provider network 400, while one or more other pipeline stages 140C may be implemented outside of the provider network. For example, packagers in a packaging stage may be implemented inside the provider network 400, while origin servers and content delivery network (CDN) servers may be implemented outside the provider network.

Figure 5:
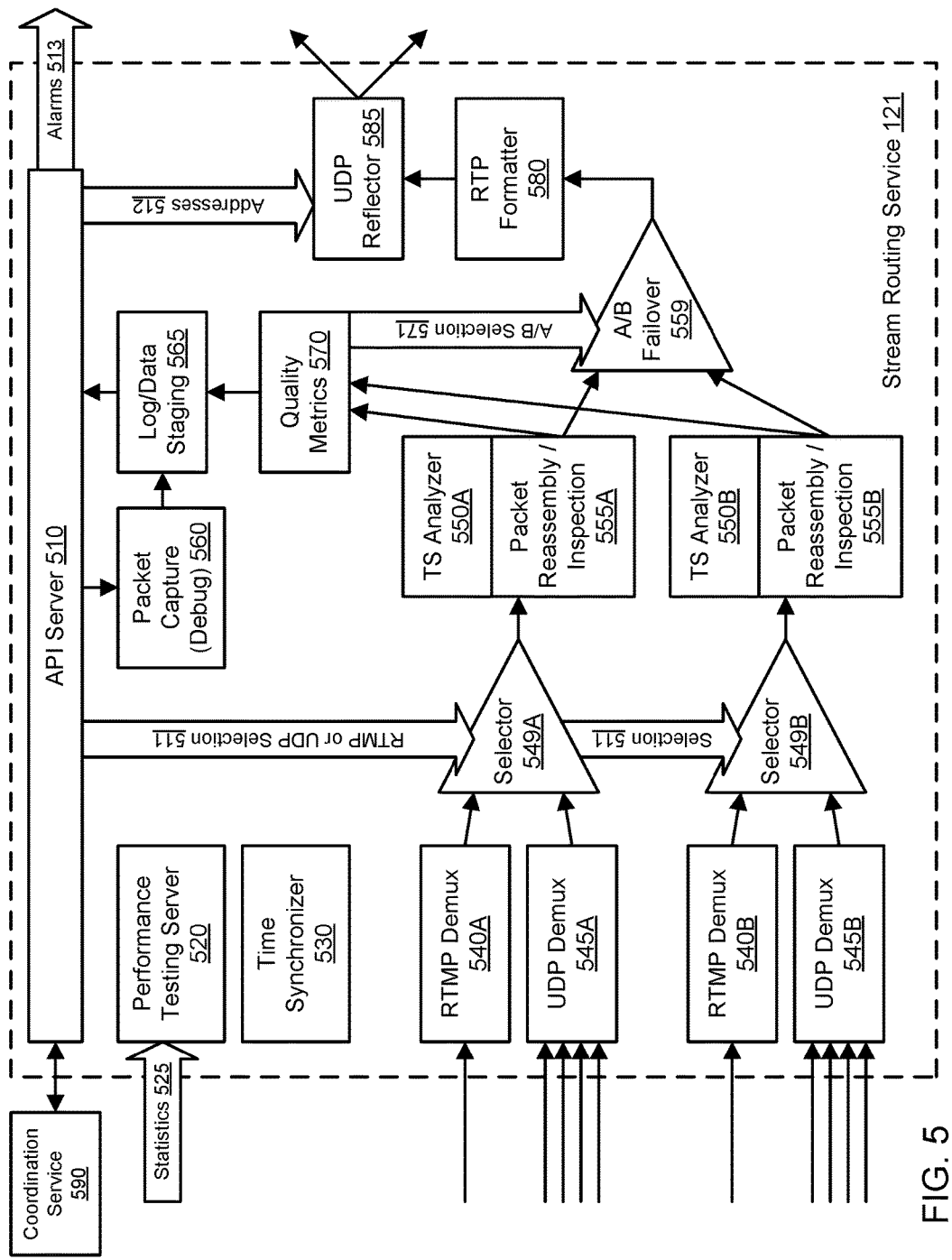
FIG. 5 illustrates further aspects of the example system environment for unicast routing of a media stream to subscribers, including additional functionalities of the stream routing service, according to one embodiment.

FIG. 5 illustrates further aspects of the example system environment for unicast routing of a media stream to subscribers, including additional functionalities of the stream routing service, according to one embodiment. In various embodiments, the stream routing service 121 may perform various functions other than acquiring and routing streams. As discussed above, the stream routing service 121 may implement an application programming interface (API) that permits external entities to interact with the service, e.g., to configure the various tasks performed by the service. An API server 510 may handle API calls from the external entities. For example, the API server 510 may receive and respond to API calls from a coordination service 590 that is external to the stream routing service 121. The coordination service 590 may send requests to subscribe a component to a particular media stream, unsubscribe a component from a particular media stream, open an endpoint and begin a connection test, specify the processing modes for an endpoint, upload decryption keys for an endpoint, control time synchronization, query for data collected for one or more endpoints, and/or otherwise configure the various additional functions shown in FIG. 5. The subscriber components may typically include various types of encoders that transform a media stream for transmission to and/or consumption by viewers, media analyzers that perform analysis of media streams (e.g., to determine and report on stream quality), storage components that store elements of media streams, and other downstream components of the media pipeline. The coordination service may be associated with an administrative console or other user interface that permits administrators of the pipeline 100 to establish connections between pipeline components. In some cases, an API call to the API server 510 may result in the stream routing service 121 starting one or more processes that listen on dynamically assigned ports until stopped by the API server.

The stream routing service 121 shown in FIG. 5 may represent one instance, and the instance may be dedicated to as few as one media streams. The stream routing service 121 may be implemented for use in a highly available manner. As shown in FIG. 5, more than one contribution stream of the same media may be sent by the content provider to separate instances of the stream routing service 121. Output locking may be coordinated across multiple encoders or other subscriber components. A downstream service may detect the loss of output from one instance of the stream routing service 121 and switch to a redundant instance.

Individual instances of the stream routing service 121 may have no knowledge of being a primary or a secondary with respect to a particular media stream or downstream component. An instance of the stream routing service 121 may maintain, for each media stream, data associated with the measured latency and bit rate, various packet statistics (e.g., loss, out of order, late), the source address (e.g., IP address) and one or more destination addresses (e.g., IP addresses), processing modes (e.g., forward error correction, demux, real time protocol [RTP] wrap, reflect, strategy for loss of input), and stream analysis (e.g., TR-101-290 MPEG stream analysis).

In one embodiment, the stream routing service 121 may act as a boundary clock according to the precision time protocol (PTP) standard as defined by IEEE 1588v2. A time synchronizer 530 may achieve time synchronization at the sub-microsecond level for instances of the stream routing service 121 as well as subscriber components. Using the time synchronization, live audio/video production switching and processing may be performed in the multi-tenant provider network 400.

Each instance of the stream routing service 121 may contain N identical failover input channels (also referred to herein as input banks or input blocks) that are assumed to provide identical source material. The instance may switch from one input channel to another channel upon detecting a failure or other quality problem of the channel. Although two input channels are illustrated in FIG. 5, it is contemplated that any suitable number and configuration of input channels may be used with the stream routing service 121. A first (or "A") input bank may include a real-time messaging protocol (RTMP) receiver component 540A that performs demultiplexing (demux) for RTMP input as well as a user datagram protocol (UDP) receiver 545A that performs demux for UDP input. Similarly, a second (or "B") input bank may include an RTMP receiver component 540B that performs demux for RTMP input as well as a UDP receiver 545B that performs demux for UDP input. Based on a selection 511 made by the API server 510, a selector 549A may select either the RTMP input or the UDP input from the first input bank. Similarly, based on a selection made by the API server 510, a selector 549B may select either the RTMP input or the UDP input from the second input bank.

The first input bank may also include a transport stream (TS) analyzer 550A and a packet reassembly/inspection component 555A, and the second input bank may also include a transport stream (TS) analyzer 550B and a packet reassembly/inspection component 555B. The TS analyzers 550A and 550B may perform stream analysis of streaming media. For example, the TS analyzers 550A and 550B may perform stream analysis of an MPEG stream according to the TR-101-290 transport stream monitoring standard. The packet reassembly/inspection components 555A and 555B may perform additional functions on the stream. For example, the packet reassembly/inspection components 555A and 555B may perform encryption, decryption, forward error correction processing, and other suitable processing tasks. In one embodiment, error recovery may be performed on the stream to provide a clean signal as output to the subscriber components. The error recovery may be consistent with SMPTE 2022, a standard from the Society of Motion Picture and Television Engineers (SMPTE) that describes how to send digital video over an IP network. Similarly, forward error correction may be added or removed in a manner consistent with SMPTE 2022. In one embodiment, the stream routing service 121 may perform multiple program transport stream (MPTS) to single program transport stream (SPTS) conversion by selecting one program from a set of multiple programs in the media stream for further routing.

In one embodiment, the health of a media stream may be determined by the stream routing service 121. The stream's health may be determined based on analysis of any current element(s) that have been acquired from the media source. One or more quality of service (QoS) or other health-related metrics (referred to herein as quality metrics) may be determined based on the analysis. As shown in FIG. 5, the TS analyzers 550A and 550B may generate quality metrics that represent a quality of service (QoS) or health of a stream. The quality metrics 570 may be sent to a log/data staging component 565. The log/data staging component may enqueue all the telemetry data to be returned to clients of the API server 510, e.g., the coordination service 590. The quality metrics 570 may be analyzed, and further action may potentially be taken based on the analysis. In one embodiment, the quality metrics 570 may be compared to one or more relevant thresholds to determine whether to take any action based on the health or quality of the stream. Typically, no action (except potentially logging the quality metrics) may be taken if the stream is deemed to be sufficiently healthy by comparing the quality metric(s) to relevant thresholds. If the stream is deemed to be insufficiently healthy, then one or more actions may be taken to remediate the low quality of the stream or generate an alert.

In one embodiment, the action(s) taken based on the health or quality (typically the low health or quality) of the stream may include sending an alarm 513 to relevant users or entities. The alarm 513 may include any relevant data or metadata, such as an identifier or description of the stream and an indication or description of the stream's health or quality. The alarm 513 may be delivered in any suitable manner, e.g., through an administrative console, an e-mail, a text message, an API call or message to another service, and so on. In one embodiment, the action(s) may include selecting one input from one of multiple input channels for further routing, e.g., based on the relative quality of the input over the various input channels as determined by quality metrics for the channels, and discarding the other inputs by not replicating them to subscribers. As shown in FIG. 5, an A/B failover component 559 may perform this selection of the output stream from one of the input channels. The selection may be based on A/B selection input 571 received from analysis of the quality metrics 570.

A real-time transport protocol (RTP) formatter 580 may create a new output stream from a selected input channel. A UDP reflector 585 may write copies of the RTP stream to multiple destination addresses associated with subscriber components using a unicast transmission techniques. The output of the UDP reflector 585 may be sent using UDP. The destination addresses 512 may be provided by the API server 510. In one embodiment, the instance of the stream routing service 121 may send the output of the UDP reflector 585 to multiple, redundant instances of the same encoder or other subscriber component.

A performance testing server 520 may measure the network speed and latency between the instance of the stream routing service 121 and each subscriber component, e.g., when the subscription is established. In one embodiment, the performance testing server 520 may implement the iperf tool for network performance measurement. Under the control of the API server 510, the performance testing server 520 may be temporarily started up on a dynamic port of the stream routing service instance and used to gather connection statistics 525 for the performance tests. A packet capture (debug) component 560 may enable network packet connection and return the captured packets for offline analysis. In one embodiment, the packet capture 560 may perform a continuous capture and write into a circular buffer; based on a trigger, the packets for the preceding few seconds may be retrieved and analyzed.

Figure 6:
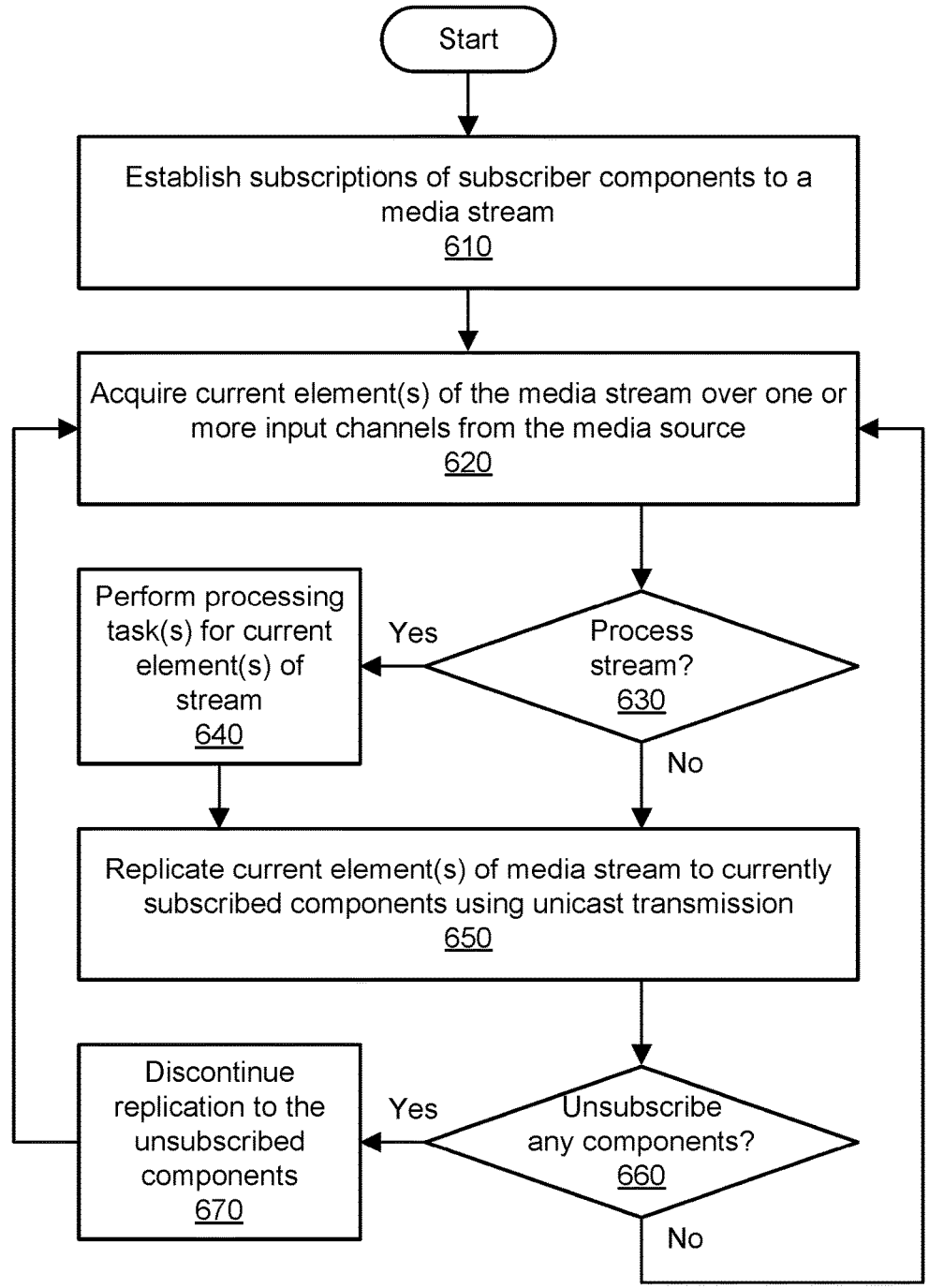
FIG. 6 is a flowchart illustrating a method for unicast routing of a media stream to subscribers, according to one embodiment.

FIG. 6 is a flowchart illustrating a method for unicast routing of a media stream to subscribers, according to one embodiment. The operations shown in FIG. 6 may be performed, at least in part, by a stream routing service. The stream routing service may be part of a media delivery pipeline to stream media, such as video or audio, to client computing devices for playback on those devices. The media may represent live or prerecorded media content, typically associated with a particular channel or a media asset from a library of streamable media. The pipeline may include multiple stages; the stages may represent various transformations of the media and/or various distribution paths for the media (e.g., from device to device over the internet) as implemented by components (potentially redundant and/or operating in parallel) within each stage. In one embodiment, the stages may include an acquisition stage, an encoding stage, and a packaging stage. In one embodiment, the stages may also include an origin server stage (also referred to as an origin stage), a content delivery network (CDN) stage, and potentially a distinct playback or player stage on one or more client devices.

At the acquisition stage, a signal representing the media may be acquired from a content provider (also referred to herein as a media source), e.g., a broadcaster. The signal may be acquired by the one or more components of the acquisition stage using any of several suitable transport mechanisms, including a camera feed, a microphone feed, an internet protocol (IP) connection, an asynchronous serial interface (ASI) connection, and so on. The stream routing service may be implemented in the acquisition stage to acquire content from one or more media sources and deliver it to an encoding stage. The stream routing service may include a router and/or a reflector for streaming media. Multiple instances of the stream routing service may be used for redundant routing of the same stream. A single instance of the stream routing service may be used for routing of multiple steams simultaneously.

At the encoding stage, the media may be transformed into a particular video or audio format, e.g., using a particular codec. The encoding stage may include compression, or a separate compression stage may be used in the pipeline. Additionally, at the encoding stage, the media may be divided into segments or chunks of a fixed or variable size. For example, the media may be divided into segments of approximately ten seconds in length for delivery via HTTP over TCP/IP. At the packaging stage, the media may be packaged and multiplexed (or "muxed") for playback on particular playback software (referred to herein as a "player") and/or a particular type of client device (e.g., a particular category of smartphone). In one embodiment, additional stages of the pipeline may perform additional transformations of the media, such as encryption performed at an encryption stage, decoding performed at a decoding stage, framerate conversion performed at a framerate conversion stage, scaling performed at a scaling stage, and/or other types of image processing (e.g., color transformation) performed at an image processing stage. Alternatively, the additional transformations may be performed as a sub-stage of another stage such as the encoding stage.

To implement the origin server stage and CDN stage, the pipeline may include one or more origin servers and a larger number of CDN servers. The origin server(s) may act as distribution points to the CDN servers. The CDN servers may be located closer to clients in terms of geography and/or network latency in order to provide efficient distribution of the media. A single origin server may provide a media stream to many CDN servers, and each CDN server may then respond to requests for media from many client devices. In some cases, such as for prerecorded media, the origin server may persistently store the media (or segments thereof) for an indefinite period of time, while the CDN servers may cache segments of the media for a more limited period of time. If a client requests particular content that is not available in the cache at a CDN server, then the CDN server may request the content from the origin server and then deliver the content to the requesting client. At the origin server stage, the media may be sent from the origin server to one or more CDN servers. If other stages such as the acquisition stage, encoding stage, and/or packaging stage are performed at the origin server, then the origin stage may include those stages or include corresponding sub-stages. However, it is also contemplated that the origin server stage may represent a distinct stage relative to the acquisition stage, encoding stage, and/or packaging stage. At the CDN stage, the media may be sent from a CDN server to a client device, e.g., as requested by the client device. In one embodiment, the stages may also include a playback stage that represents attempted playback by a player on a client device.

Multiple computing devices may typically be used to implement the multi-stage pipeline. In some circumstances, more than one stage may be performed by the same computing device. The stream routing service may be implemented using one or more computing resources, such as virtual compute instances or physical compute instances, that are provisioned from a provider network. In one embodiment, each instance of the stream routing service may be implemented using a different compute instance. The provider network may offer multi-tenancy such that a pool of computing resources (e.g., compute instances, storage instances, database instances, and so on) may be shared by multiple clients of the provider network at any given time. In one embodiment, multicast transmission over network connections between components (e.g., compute instances with network adapters) may be prohibited within the provider network. Additional components of the pipeline, such as encoders that subscribe to streams using the stream routing service, may also be provisioned using resources of the provider network. Other pipeline components, such as client devices and potentially content providers and/or content delivery network (CDN) servers for the stream, may be implemented outside of the provider network.

As shown in 610 of FIG. 6, subscriptions may be established or configured for subscriber components to a media stream. The subscriptions may be configured using the particular instance of the stream routing service that is handling the particular media stream. The subscriber components may include one or more encoders (e.g., components in the encoding stage) in the media pipeline that seek to receive the particular media stream and perform encoding tasks (potentially including compression, segmentation, and so on) on the stream before passing the encoded stream to another stage of the pipeline. The subscriber components may also include one or more components of other stages in the media pipeline or potentially components outside of the media pipeline, e.g., components responsible for storing or analyzing the media stream. In one embodiment, requests to subscribe to a media stream may be received by an application programming interface (API) associated with the stream routing service. The requests to subscribe may be received from a coordinator service or component or from the subscriber components themselves.

A request to subscribe may include any suitable data or metadata, such as an identifier of the particular media stream and an individual address (e.g., IP address) of the subscriber to which the stream should be directed by the stream routing service. The identifier of the media stream may be a content identifier that is globally unique within some context, e.g., within a media streaming system that includes multiple instances of the stream routing service. For example, if the media represents a live video stream, then the content identifier may indicate a particular channel. As another example, if the media represents prerecorded media content, then the content identifier may indicate a particular media asset from a library of media. In some embodiments, the request to subscribe may also indicate a starting time and/or ending time for the subscription or may instead indicate that the subscription should start upon receipt and continue indefinitely.

A portion of the media stream may have been acquired and routed by the stream routing service prior to establishing one or more of the subscriptions discussed above. As shown in 620, one or more current elements of the media stream may be acquired over one or more input channels from a media source. The current elements may correspond to packets or other units of data as transmitted over the input channel(s) and may be part of an ordered sequence of such elements. In one embodiment, a segment identifier associated with each element may indicate the relative position in the sequence. Multiple input channels may be used from the same media source to the same instance of the stream routing service for redundancy. In one embodiment, the input channels may differ in some capacity, e.g., by using two or more Internet service providers (ISPs) to send the media stream from the media source to the stream routing service using parallel pathways. The input channel(s) may use any suitable protocol, such as UDP and/or TCP. In one embodiment, redundant instances of the stream routing service may also be used to acquire the current element(s) of the media stream. Any of the redundant instances of the stream routing service may also use redundant, parallel pathways to acquire the media stream.

As shown in 630, it may be determined whether the current element(s) of the stream should be processed in any way prior to routing the element(s) to the subscribers. The processing tasks may be configured using an API associated with the stream routing service. In various embodiments, the processing tasks may include measuring the quality of the stream (based at least in part on the current element(s)) and potentially taking action based on the quality measurement, performing error correction, performing encryption on the media stream, performing decryption on the media stream, selecting one program from a set of multiple programs in the media stream for further routing, selecting the input from one of multiple input channels for further routing (e.g., based on its higher quality), and/or any other suitable tasks. As shown in 640, the processing task(s), if any, may be performed on or using the current element(s) of the media stream.

As shown in 650, the current element(s) of the media stream may be replicated to the subscriber components (e.g., the components that have subscribed to the media stream using this instance or these instances of the stream routing service). The stream routing service may use unicast transmission techniques (rather than multicast transmission techniques) to send the current element(s) of the stream to each of the subscribers on an individual basis. To replicate the current element(s), the stream routing service may generate one or more packets or other units of data that include the current element(s) (potentially as processed in 640) in a form that is transmissible to the subscriber components. The stream routing service may individually address the packet(s) or unit(s) to each of the subscriber components, e.g., such that each element of the media stream is not sent once to a group address but sent in parallel to individual addresses of the subscriber components.

As shown in 660, it may be determined whether any components should be unsubscribed from the media stream. A subscriber component may need to be detached from the stream when the component fails, when the component is switched with another component or when the pipeline is otherwise reconfigured, when the media stream is no longer sought to be transmitted through that particular part of the pipeline (e.g., due to a diminished demand from viewers), or for any other suitable reason. In one embodiment, a component may be unsubscribed based (at least in part) on an explicit request to unsubscribe. In one embodiment, requests to unsubscribe to a media stream may be received by an API associated with the stream routing service (e.g., by the particular instance of the stream routing service that is handling the particular media stream). The requests to unsubscribe may be received from a coordinator service or component or from the subscriber components themselves. A request to unsubscribe may include any suitable data or metadata, such as an identifier of the particular media stream and an individual address (e.g., IP address) or other identifier of the subscriber. In some embodiments, the request to unsubscribe may also indicate an ending time for the subscription or may instead indicate that the subscription should cease upon receipt. In one embodiment, a component may be unsubscribed based (at least in part) on an automatic determination by the stream routing service. For example, if packets or units of data are deemed to be undeliverable to an address associated with a particular subscriber, then the stream routing service may automatically unsubscribe that component. As shown in 670, replication of the media stream may be discontinued to any of the subscriber components that have unsubscribed from the stream. As shown in 620, the next set of one or more current elements may be acquired from the media source for routing to the current set of subscriber components as discussed above.

Figure 7:
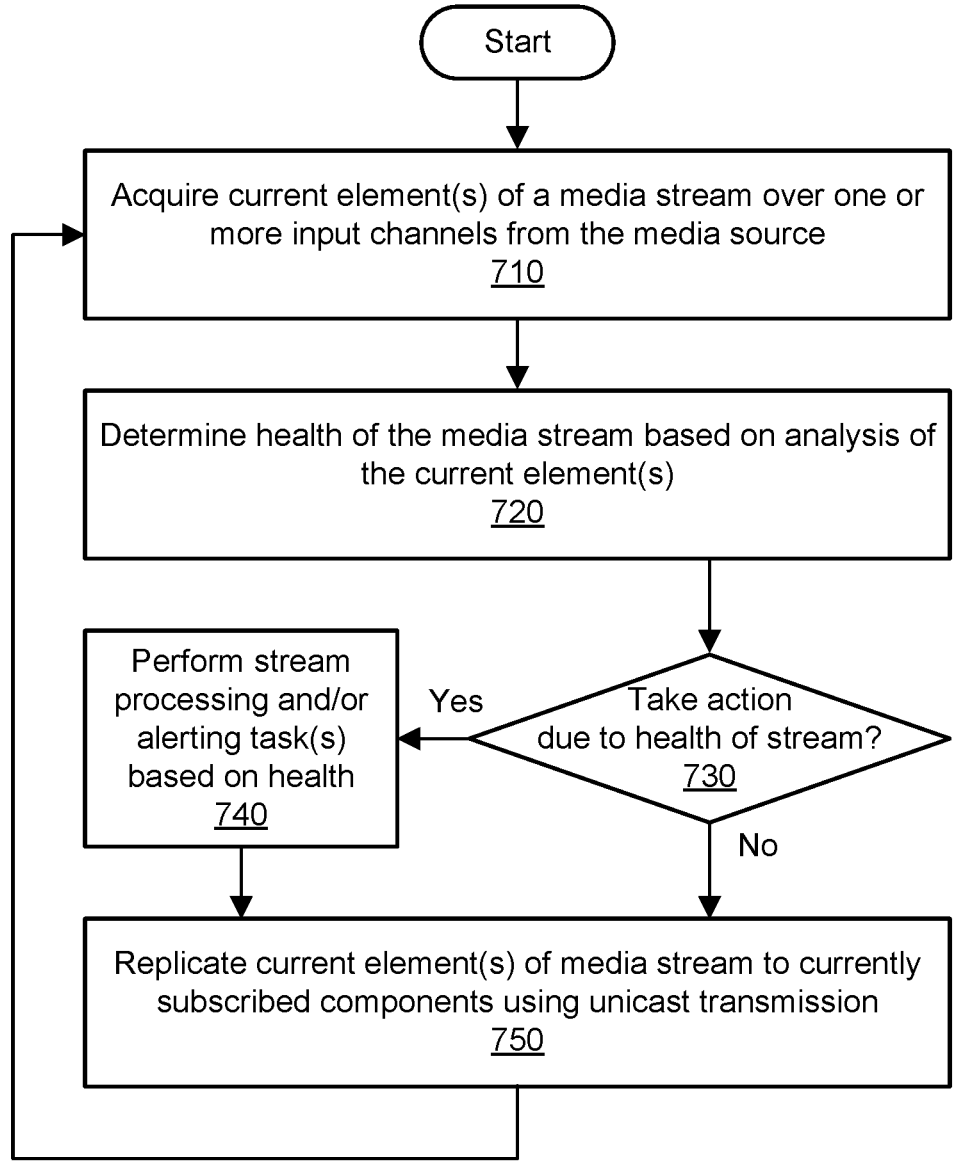
FIG. 7 is a flowchart illustrating a method for unicast routing of a media stream to subscribers, including monitoring of stream health, according to one embodiment.

FIG. 7 is a flowchart illustrating a method for unicast routing of a media stream to subscribers, including monitoring of stream health, according to one embodiment. The operations shown in FIG. 7 may be performed, at least in part, by the stream routing service. As shown in 710, one or more current elements of a media stream may be acquired over one or more input channels from a media source. The current elements may correspond to packets or other units of data as transmitted over the input channel(s) and may be part of an ordered sequence of such elements. In one embodiment, a segment identifier associated with each element may indicate the relative position in the sequence. Multiple input channels may be used from the same media source to the same instance of the stream routing service for redundancy. In one embodiment, the input channels may differ in some capacity, e.g., by using two or more Internet service providers (ISPs) to send the media stream from the media source to the stream routing service using parallel pathways. The input channel(s) may use any suitable protocol, such as UDP and/or TCP. In one embodiment, redundant instances of the stream routing service may also be used to acquire the current element(s) of the media stream. Any of the redundant instances of the stream routing service may also use redundant, parallel pathways to acquire the media stream.

As shown in 720, the health of the media stream may be determined. The stream's health may be determined based on analysis of the current element(s). One or more quality of service (QoS) or other health-related metrics (referred to herein as quality metrics) may be determined based on the analysis. The health determination shown in 720 may be configured using an API associated with the stream routing service. For example, any actions to take based on the health of the stream may be configured by an administrator or coordinator service using an API associated with the stream routing service. As shown in 730, the stream routing service may determine whether to take any action(s) due to the health of the stream. In one embodiment, the quality metrics may be compared to one or more relevant thresholds to determine whether to take any action. Typically, no action (except potentially logging the quality metrics) may be taken if the stream is deemed to be sufficiently healthy by comparing the quality metric(s) to relevant thresholds. If the stream is deemed to be insufficiently healthy, then one or more actions may be taken to remediate the low quality of the stream or generate an alert.

As shown in 740, any actions may be taken based on the health or quality (typically the low health or quality) of the stream. In one embodiment, the action(s) may include sending an alert or alarm to relevant users or entities. The alert may include any relevant data or metadata, such as an identifier or description of the stream and an indication or description of the stream's health or quality, and the alert may be delivered in any suitable manner (e.g., through an administrative console, an e-mail, a text message, an API call or message to another service, and so on). In one embodiment, the action(s) may include performing error correction on the current element(s) of the stream. In one embodiment, the action(s) may include selecting one input from one of multiple input channels for further routing, e.g., based on the relative quality of the input over the various input channels as determined by quality metrics for the channels, and discarding the other inputs by not replicating them to subscribers.

As shown in 750, the current element(s) of the media stream may be replicated to any subscriber components (e.g., the components that have subscribed to the media stream using this instance or these instances of the stream routing service). The stream routing service may use unicast transmission techniques (rather than multicast transmission techniques) to send the current element(s) of the stream to each of the subscribers on an individual basis. To replicate the current element(s), the stream routing service may generate one or more packets or other units of data that include the current element(s) (potentially as processed in 740) in a form that is transmissible to the subscriber components. The stream routing service may individually address the packet(s) or unit(s) to each of the subscriber components, e.g., such that each element of the media stream is not sent once to a group address but sent in parallel to individual addresses of the subscriber components.

Monitoring Media Pipeline Health Using Tracing

FIG. 8 illustrates an example system environment for monitoring of media pipeline health using tracing, according to one embodiment. A media streaming system 1100 may implement a media delivery pipeline to stream media, such as video or audio, to client computing devices 1170 for playback on those devices. The media may represent live media content (e.g., a live stream associated with a particular channel) or prerecorded media content (e.g., a media asset from a library of streamable media). The pipeline may include multiple stages; the stages may represent various transformations of the media and/or various distribution paths for the media (e.g., from device to device over the internet).

The client computing devices 1170 may be associated with and/or operated by one or more clients of the media streaming system 1100; as used herein, the terms "client computing device," "client device," and "client" may be used interchangeably. The client computing devices 1170A may be coupled to portions of the media streaming system 1100 via one or more networks, potentially including the Internet. A client may represent a customer (e.g., an individual or group entity) of the media streaming system 1100. Typically, a user associated with one of the client computing devices 1170 may have an account that has privileges to access media content provided by the media streaming system 1100. The access may be fee-based or may instead be free to the user (potentially with advertisements in the streaming media or player software). However, some media may also be streamable to users without accounts or other arrangements, e.g., on websites that provide streaming video.

It is contemplated that the media delivery pipeline implemented by the media streaming system 1100 may include various combinations of stages, including the particular combination illustrated in FIG. 8. In one embodiment, as shown in FIG. 8, the stages of the pipeline may include an acquisition stage 1120, an encoding stage 1130, and a packaging stage 1140. At the acquisition stage 1120, a signal representing the media may be acquired from one or more content providers 110, e.g., broadcasters. The signal may be acquired by the media streaming system 1100 using any of several suitable transport mechanisms, including a camera feed, a microphone feed, an internet protocol (IP) connection, an asynchronous serial interface (ASI) connection, and so on. At the encoding stage 1130, the media may be transformed into a particular video or audio format, e.g., using a particular codec. The encoding stage 1130 may include compression, or a separate compression stage may be used in the pipeline. Additionally, at the encoding stage 1130, the media may be divided into segments or chunks of a fixed or variable size. For example, the media may be divided into segments of approximately ten seconds in length for delivery via HTTP over TCP/IP. At the packaging stage 1140, the media may be packaged and multiplexed (or "muxed") for playback on particular playback software (referred to herein as a "player") and/or a particular type of client device (e.g., a particular category of smartphone). In one embodiment, additional stages of the pipeline may perform additional transformations of the media, such as encryption performed at an encryption stage, decoding performed at a decoding stage, framerate conversion performed at a framerate conversion stage, scaling performed at a scaling stage, advertisement insertion performed at an advertisement insertion stage, and/or other types of image processing (e.g., color transformation) performed at an image processing stage. Alternatively, one of the additional transformations may be performed as a sub-stage of another stage such as the encoding stage 1130.

In one embodiment, as shown in FIG. 8, the stages may include an origin server stage (also referred to as an origin stage) 1150 and a content delivery network (CDN) stage 1160. The pipeline may include one or more origin servers and a larger number of CDN servers. The origin server(s) may act as distribution points to the CDN servers. The CDN servers may be located closer to clients in terms of geography and/or network latency in order to provide efficient distribution of the media. A single origin server may provide a media stream to many CDN servers, and each CDN server may then respond to requests for media from many client devices. In some cases, such as for prerecorded media, the origin server may persistently store the media (or segments thereof) for an indefinite period of time, while the CDN servers may cache segments of the media for a more limited period of time. If a client requests particular content that is not available in the cache at a CDN server, then the CDN server may request the content from the origin server and then deliver the content to the requesting client. At the origin server stage 1150, the media may be sent from the origin server to one or more CDN servers. If other stages such as the acquisition stage 1120, encoding stage 1130, and/or packaging stage 1140 are performed at the origin server, then the origin stage 1150 may include those stages or include corresponding sub-stages. However, it is also contemplated that the origin server stage 1150 may represent a distinct stage relative to the acquisition stage 1120, encoding stage 1130, and/or packaging stage 1140. At the CDN stage 1160, the media may be sent from a CDN server to a client device 1170, e.g., as requested by the client device. In one embodiment, the stages may also include a playback stage that represents attempted playback by a player (e.g., implemented in player software) on a client device 1170.

In one embodiment, tracing metadata may be generated for one or more portions or elements of a media stream (e.g., segments of the stream) at particular stages of the media delivery pipeline. The tracing metadata may include a content identifier for the media stream. The content identifier may be globally unique within the context of the media streaming system. For example, if the media represents a live video stream, then the content identifier may indicate a particular channel. As another example, if the media represents prerecorded media content, then the content identifier may indicate a particular media asset from a library of media. In one embodiment, the content identifier may be generated once (e.g., at the acquisition stage 1120) and then propagated from stage to stage. The tracing metadata may include a segment identifier for each segment or other element. For example, the segment identifiers may be ordered to reflect a sequence of the segments or elements of the streaming media. In one embodiment, the segment identifier may be generated first at one stage (e.g., at the encoding stage 1130) and then propagated from stage to stage. As used herein, generating tracing metadata may include creating at least a portion of the metadata for the first time at a stage and/or reusing at least a portion of the metadata from a previous stage or other source. The tracing metadata may include a stage identifier for the particular stage. The stage identifier may indicate the type of stage (e.g., acquisition, encoder, packager, origin, CDN, playback) and potentially the particular instance, component, or device within the stage that generates the metadata. In some circumstances, a stage identifier may represent a sub-stage of a particular stage. The tracing metadata may include a timestamp, e.g., as expressed in Coordinated Universal Time (UTC) or any other suitable time standard.

In one embodiment, the tracing metadata for a particular stage may be generated more than once within that stage, e.g., on input and output and/or at multiple sub-stages within the stage. For example, the tracing metadata may be generated both when a segment is received and also when a segment is transferred to the next stage of the pipeline. In such an embodiment, the timestamps may differ for the first or "input" set of tracing metadata and the second or "output" set of tracing metadata at a particular stage. The tracing metadata may also include stage-specific elements, e.g., indicating errors that occur in any attempted operations at the stage. In various embodiments, tracing metadata may not be generated at every stage of the pipeline. However, analysis of the health of the pipeline will typically improve when tracing data is generated by a greater number of stages.

The tracing metadata (or at least a portion thereof) may be attached to the one or more segments or other elements before the segments or elements are sent to the next stage of the pipeline. A segment or portion may said to be tagged with the tracing metadata for that segment or portion. The content identifier and segment identifier may typically be generated once and then propagated from stage to stage, while the stage identifier may be omitted from the segment sent to the next stage or sent but then discarded at the next stage. As shown in FIG. 8, the tracing metadata may also be sent to a centralized component such as a metadata repository 1180. In particular, the acquisition stage 1120 may generate and send tracing metadata 1125, the encoding stage 1130 may generate and send tracing metadata 1135, the packaging stage 1140 may generate and send tracing metadata 1145, the origin server stage 1150 may generate and send tracing metadata 1155, the CDN stage 1160 may generate and send tracing metadata 1165, and/or the playback stage at the clients 1170 may generate and send tracing metadata 1175. Each stage may include individual components that perform the function(s) associated with that stage. The components at the various stages of the pipeline may be instrumented in order to generate tracing metadata, e.g., using an appropriate development kit that includes program code for generating and sending the metadata.

The tracing metadata may be sent to the metadata repository 1180 substantially in real time, or at least without a significant delay. In one embodiment, the tracing data may be packaged and then sent when a sufficient amount (potentially for multiple different media streams) has accumulated at the stage. Typically, most stages that send tracing data to the metadata repository 1180 may do so without being prompted by the metadata repository or other centralized component of the media streaming system. In some embodiments, not every stage may send tracing metadata without being prompted by a centralized component. For example, the CDN servers at the CDN stage 1160 may not generate or send tracing data 1165 automatically, but they may generate and periodically send logs (potentially on request) that may contain tracing metadata 1165 or that can otherwise be used to infer the health of media streams at the CDN stage. The metadata repository 1180 may be maintained by the media streaming system 1100 using locally accessible storage resources or external storage resources such as a database service or system.

Using a functionality for pipeline health analysis 1190, the health of the pipeline may be monitored using the tracing metadata. In one embodiment, a problematic stage may be determined based (at least in part) on analysis of the tracing metadata. A problematic stage may represent a stage or component of a stage that is deemed responsible for problematic delivery or problematic playback of media. The analysis may be performed either reactively or proactively. The reactive analysis may typically be performed after a report of problematic delivery is received, e.g., from a client (e.g., an end user operating a client computing device on which playback was attempted) or from another organization involved in the pipeline such as a broadcaster who generated the media content, a publisher of player software on the client device, a publisher of operating system software on the client device, a distributor or vendor of the client device, and so on. Problematic delivery (also referred to herein as problematic playback) may include playback that never begins, playback that begins but then stops prematurely, playback with sound but not video, playback with video but not sound, playback with low-quality or distorted video, playback with low-quality or distorted sound, playback with improperly synchronized sound and video, slow or choppy playback, and/or any other form of attempted playback that does not meet client expectations. In one embodiment, the pipeline health analysis 1190 may be offered as a service to a plurality of clients. The pipeline health analysis is discussed in greater detail with respect to FIG. 12 through FIG. 14.

In some embodiments, components of the media streaming system 1100 such as servers, storage resources, and network resources may be implemented using resources of a provider network. The provider network may be set up by an entity such as a company or a public sector organization to provide one or more services (such as various types of cloud-based computing or storage) accessible via the Internet and/or other networks to clients. The provider network may include numerous data centers hosting various resource pools, such as collections of physical and/or virtualized computer servers, storage devices, networking equipment and the like (e.g., implemented using the example computing system 3000 described below with regard to FIG. 16), needed to implement and distribute the infrastructure and services offered by the provider network. In some embodiments, the provider network may provide computing resources and services, such as services associated with the media streaming system 1100; storage services, such as a block-based storage service, key-value based data stores, or various types of database systems; and/or any other type of network-based services. Clients may access these various services offered by provider network via one or more networks, potentially including the Internet. Likewise, network-based services may themselves communicate and/or make use of one another to provide different services. For example, computing resources offered in units called "instances," such as virtual or physical compute instances or storage instances, may make use of particular data volumes, providing virtual block storage for the compute instances.

The provider network may implement or provide a multi-tenant environment such that multiple clients (e.g., content providers 1110 and/or end user clients 1170) may access or use a particular resource or service in a substantially simultaneous manner. Functionality of the media streaming system 1100, such as a pipeline health analysis service 1190, may be offered to multiple clients (in a substantially simultaneous manner) in such a multi-tenant provider network, such that the same computational and storage resources associated with the media streaming system may be used on behalf of different clients over the same window of time. The different clients may represent different individuals and/or different organizations that may pay the provider network for access to one or more services and/or resources. The provider network may include a fleet of computing devices, also referred to herein as servers, hosts, or instances, which are configured to execute software on behalf of clients of the provider network. In one embodiment, a fleet of servers may grow or shrink as individual servers are provisioned or deprovisioned using resources of the provider network. In one embodiment, the fleet of servers may grow or shrink as individual servers are added to or removed from a dedicated fleet by an administrator.

The content providers 1110 may be individuals or entities who provide streaming media content to the media streaming system 1100 for potential delivery to the clients 1170. The content providers 1110 as illustrated in FIG. 8 may correspond to computing devices that are connected to the media streaming system 1100 over one or more networks, potentially including the Internet. The computing devices associated with the content providers 1110 may encompass any type of hardware and software that are configurable to submit requests to the media streaming system 1100 (e.g., implemented using the example computing system 3000 described below with regard to FIG. 16). Similarly, the computing devices associated with the clients 1170 may encompass any type of hardware and software that are configurable to consume streaming media provided by the media streaming system 1100 (e.g., implemented using the example computing system 3000 described below with regard to FIG. 16). For example, a client computing device may include a dedicated media player, a suitable version of a web browser, and/or a plug-in module or other type of code module configured to execute as an extension to or within an execution environment provided by a web browser or other form of client software. In some embodiments, such a client application may include sufficient protocol support (e.g., for a suitable version of Hypertext Transfer Protocol [HTTP]) for generating and processing network-based service requests.

Content providers 1110 and/or client computing devices 1170 may convey network-based requests to the media streaming system 1100 via one or more external networks. In various embodiments, the external network(s) may encompass any suitable combination of networking hardware and protocols necessary to establish network-based communications between computing devices and the media streaming system 1100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given computing device and the media streaming system 1100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given computing device and the Internet as well as between the Internet and the media streaming system 1100. It is noted that in some embodiments, computing devices for content providers 1110 and/or clients 1170 may communicate with the media streaming system 1100 using a private network in addition to or instead of the public Internet.

The media streaming system 1100 may include a plurality of computing devices, any of which may be implemented by the example computing device 3000 illustrated in FIG. 16. In various embodiments, portions of the described functionality of the media streaming system 1100 may be provided by the same computing device or by any suitable number of different computing devices. If any of the components of the media streaming system 1100 are implemented using different computing devices, then the components and their respective computing devices may be communicatively coupled, e.g., via a network. Each of the illustrated components (such as the various stages 1120, 1130, 1140, 1150, and 1160 as well as the metadata repository 1180 and pipeline health analysis functionality 1190) may represent any combination of software and hardware usable to perform their respective functions. Multiple computing devices may typically be used to implement the multi-stage pipeline. In some circumstances, more than one stage may be performed by the same computing device.

It is contemplated that the media streaming system 1100 may include additional components not shown, fewer components than shown, or different combinations, configurations, or quantities of the components shown. For example, although various stages such as stages 1120, 1130, 1140, 1150, and 1160 are shown for purposes of example and illustration, it is contemplated that different quantities and configurations of stages may be used. Additionally, it is contemplated that some of the stages 1120, 1130, 1140, 1150, and 1160 may include redundant components that collectively provide the functionality of the particular stage. Aspects of the functionality described herein may be performed, at least in part, by components outside of the media streaming system 1100.

Figure 9:
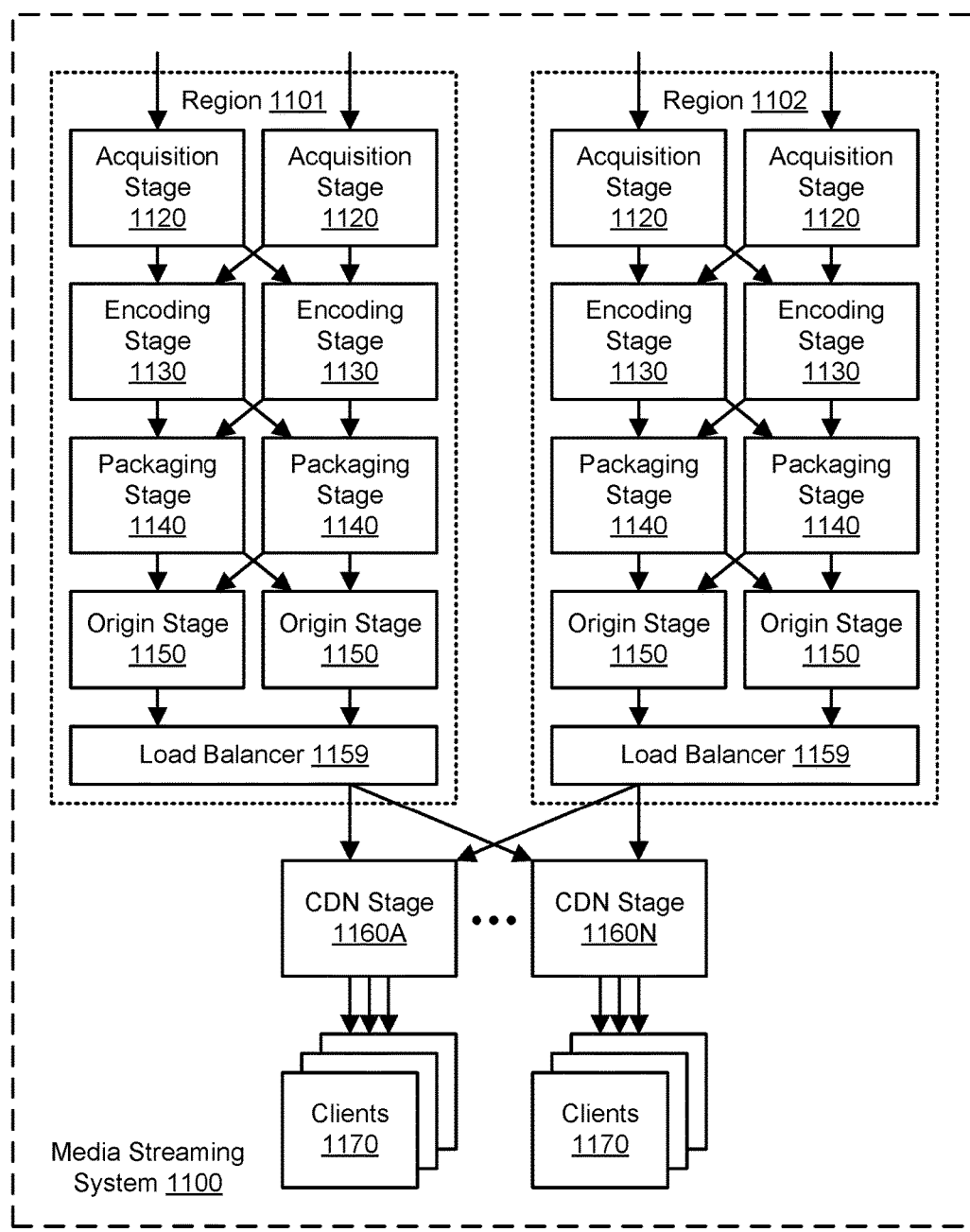
FIG. 9 illustrates further aspects of the example system environment for monitoring of media pipeline health using tracing, including redundant components of stages, according to one embodiment.

FIG. 9 illustrates further aspects of the example system environment for monitoring of media pipeline health using tracing, including redundant components of stages, according to one embodiment. As discussed above, at least some of the stages 1120, 1130, 1140, 1150, and 1160 may include redundant components that collectively provide the functionality of the particular stage. The redundancy of components in the same stage may permit the pipeline to be rerouted to bypass a problematic component in that stage. As shown in the example of FIG. 9, the media streaming system 1100 may be divided into multiple regions such as region 1101 and region 1102. The different regions 1101 and 1102 may represent different zones within a provider network whose resources are used to implement the media streaming system 1100. The different regions 1101 and 1102 may represent geographical divisions of underlying components, including different nations, states or political subdivisions, continents, arbitrary zones, or data centers. Each of the regions 1101 and 1102 may implement a media delivery pipeline with multiple stages. Within each region, a particular stage may be implemented with redundancy. For example, multiple components operating in parallel may implement the acquisition stage 1120, the encoding stage 1130, the packaging stage 1140, and the origin stage 1150 within each region. As illustrated in FIG. 9, the redundant components within a stage in a particular zone may also implement redundancy with respect to the connections to components in the previous stage and/or in the next stage. Each of the regions 1101 and 1102 may also include a load balancer fleet 1159. The load balancers 1159 may efficiently distribute requests between the origin state 1150 and the CDN stage, as represented by CDN components 1160A-1160N. The CDN stage 1160A-1160N may respond to requests for streaming media from clients 1170. As discussed above, the media streaming system 1100 may typically have many clients 1170 per CDN server and many CDN servers per origin server.

Figure 10:
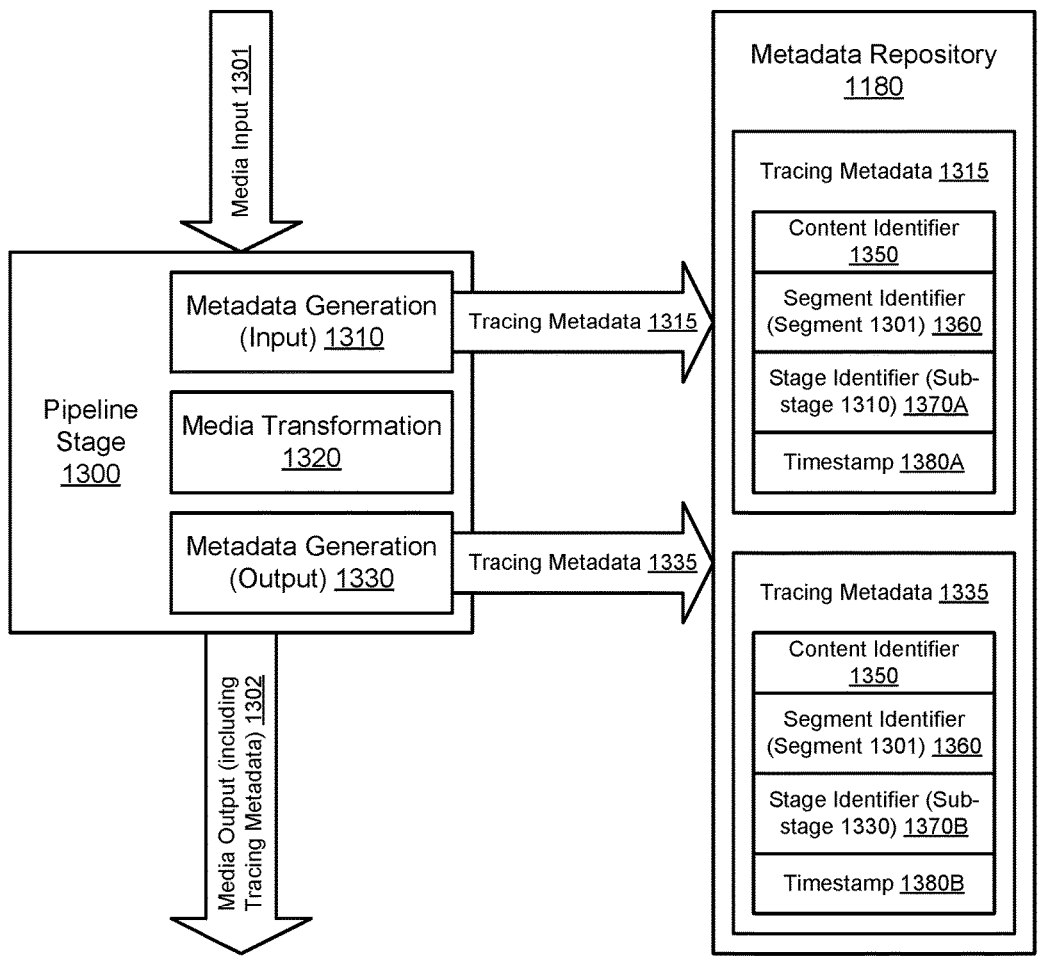
FIG. 10 illustrates the generation of tracing metadata at different points of a stage, according to one embodiment.

FIG. 10 illustrates the generation of tracing metadata at different points of a stage, according to one embodiment. As discussed above, the tracing metadata for a particular stage may be generated more than once within that stage, e.g., on input and output. As shown in the example of FIG. 10, a pipeline stage 1300 may include metadata generation (input) 1310 to generate tracing metadata 1315 when media input (such as a segment) 1301 is received (e.g., from the previous stage) and also metadata generation (output) 1330 to generate tracing metadata 1335 when media output (such as a segment) 302 is generated or sent (e.g., to the next stage). For some types of stages, such as the acquisition stage 1120, the input 1301 may represent one or more portions or other elements of the media stream rather than segments. In between the metadata generation (input) 1310 and metadata generation (output) 1330, the stage 1300 may optionally perform a media transformation 1320 on the media. The pipeline stage 1300 may represent one or more of the stages shown in FIG. 8, e.g., the acquisition stage 1120, encoding stage 1130, packaging stage 1140, origin stage 1150, and/or CDN stage 1160.

In one embodiment, tracing metadata may be generated one or more times for each element of media input 1301 of a media stream at a particular pipeline stage 1300 of the media delivery pipeline. As shown in the example of FIG. 10, the tracing metadata 1315 (generated on input) and tracing metadata 1335 (generated on output) may include a content identifier for the media stream. The content identifier 1350 may be globally unique within the context of the media streaming system 1100. For example, if the media represents a live video stream, then the content identifier 1350 may indicate a particular channel. As another example, if the media represents prerecorded media content, then the content identifier 1350 may indicate a particular media asset from a library of streamable media. In one embodiment, the content identifier 1350 may be generated once (e.g., at the acquisition stage 1120) and then propagated from stage to stage. The tracing metadata 1315 and 1335 may include a segment identifier 1360 for the media input (e.g., segment) 1301. For example, the segment identifiers may be ordered to reflect a sequence of the segments or other elements in the streaming media. In one embodiment, the segment identifier 1360 may be generated once (e.g., at the encoding stage 1130) and then propagated from stage to stage. The tracing metadata 1315 and 1335 may include a stage identifier for the particular stage 1300. The stage identifiers 1370A and 1370B may indicate the type of stage (e.g., acquisition, encoder, packager, origin, CDN, playback), the sub-stage (if any, e.g., input sub-stage 1310 for stage identifier 1370A and output sub-stage 1330 for stage identifier 1370B), and potentially the particular instance, component, or device within the stage that generates the metadata. The tracing metadata may include a timestamp. As shown in the example of FIG. 10, the timestamp 1380A for the tracing metadata 1315 generated on input may differ from the timestamp 1380B for the tracing metadata 1335 generated on output. Differing timestamps within a stage or from stage to stage may be used to diagnose the source of slow delivery in the media delivery pipeline.

The tracing metadata (or at least a portion thereof) 1335 may be attached to the output media (e.g., segment) 1302 before the output is sent to the next stage of the pipeline. The output 1302 may said to be tagged with the tracing metadata for that segment. The content identifier 1350 and segment identifier 1360 may typically be generated once and then propagated from stage to stage, while the stage identifier 1370 may be omitted from the segment 1302 sent to the next stage or sent but then discarded at the next stage. As shown in FIG. 10, the tracing metadata 1315 and 1335 may be sent to a metadata repository 1180 or other centralized component.

The tracing metadata 1315 and 1335 may be sent to the metadata repository 1180 substantially in real time, or at least without a significant delay. In one embodiment, the tracing data 1315 and 1335 may be packaged and then sent when a sufficient amount (potentially for multiple different media streams) has accumulated at the stage 1300. The stage 1300 may send the tracing data 1315 and 1335 with or without being prompted by the metadata repository 1180 or other centralized component of the media streaming system. In one embodiment, the tracing metadata 1315 and/or 1335 may be stored in a log by the pipeline stage 1300.

Figure 11:
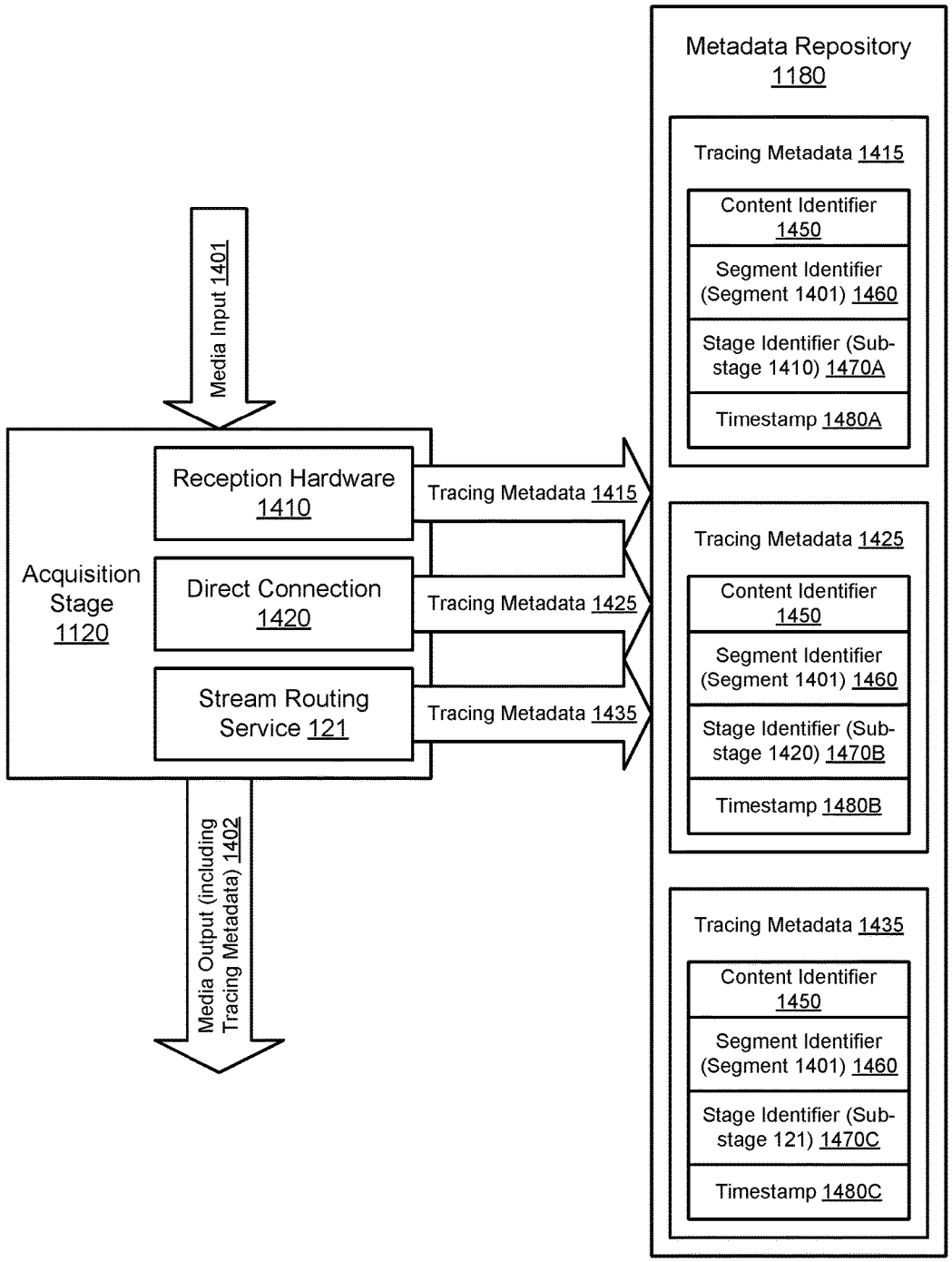
FIG. 11 illustrates the generation of tracing metadata at different sub-stages of a stage, according to one embodiment.

FIG. 11 illustrates the generation of tracing metadata at different sub-stages of a stage, according to one embodiment. As discussed above, the tracing metadata for a particular stage may be generated more than once within that stage, e.g., at multiple sub-stages within the stage. As shown in the example of FIG. 11, the acquisition stage 1120 may include sub-stages for reception hardware 1410, direct connection 1420, and an instance of the stream routing service 121. Upon receipt and processing of media input 1401, the reception hardware sub-stage 1410 may generate and send tracing metadata 1415, the direct connection sub-stage 1420 may generate and send tracing metadata 1425, and the stream routing service 121 may generate and send tracing metadata 1435. Additionally, the acquisition stage 1120 may generate and send tracing metadata on receipt of media input 1401 to the stage and on sending of media output 1402 from the stage, as discussed above.

As shown in the example of FIG. 11, the tracing metadata 1415, 1425, and 1435 may include a content identifier 1450 for the media stream. The tracing metadata 1415, 1425, and 1435 may include a segment identifier 1460 for the portion of the media stream in the media input 1401. The tracing metadata 1415 may include a stage identifier 1470A of the sub-stage 1410, whereas the tracing metadata 1425 may include a stage identifier 1470B of the sub-stage 1420, and the tracing metadata 1435 may include a stage identifier 1470C of the sub-stage 121. The tracing metadata 1415, 1425, and 1435 may include a timestamp. As shown in the example of FIG. 11, the timestamps 1480A, 1480B, and 1480C in the respective tracing metadata 1415, 1425, and 1435 may differ. Differing timestamps within a stage or from sub-stage to sub-stage may be used to diagnose the source of slow delivery in the media delivery pipeline.

Figure 12:
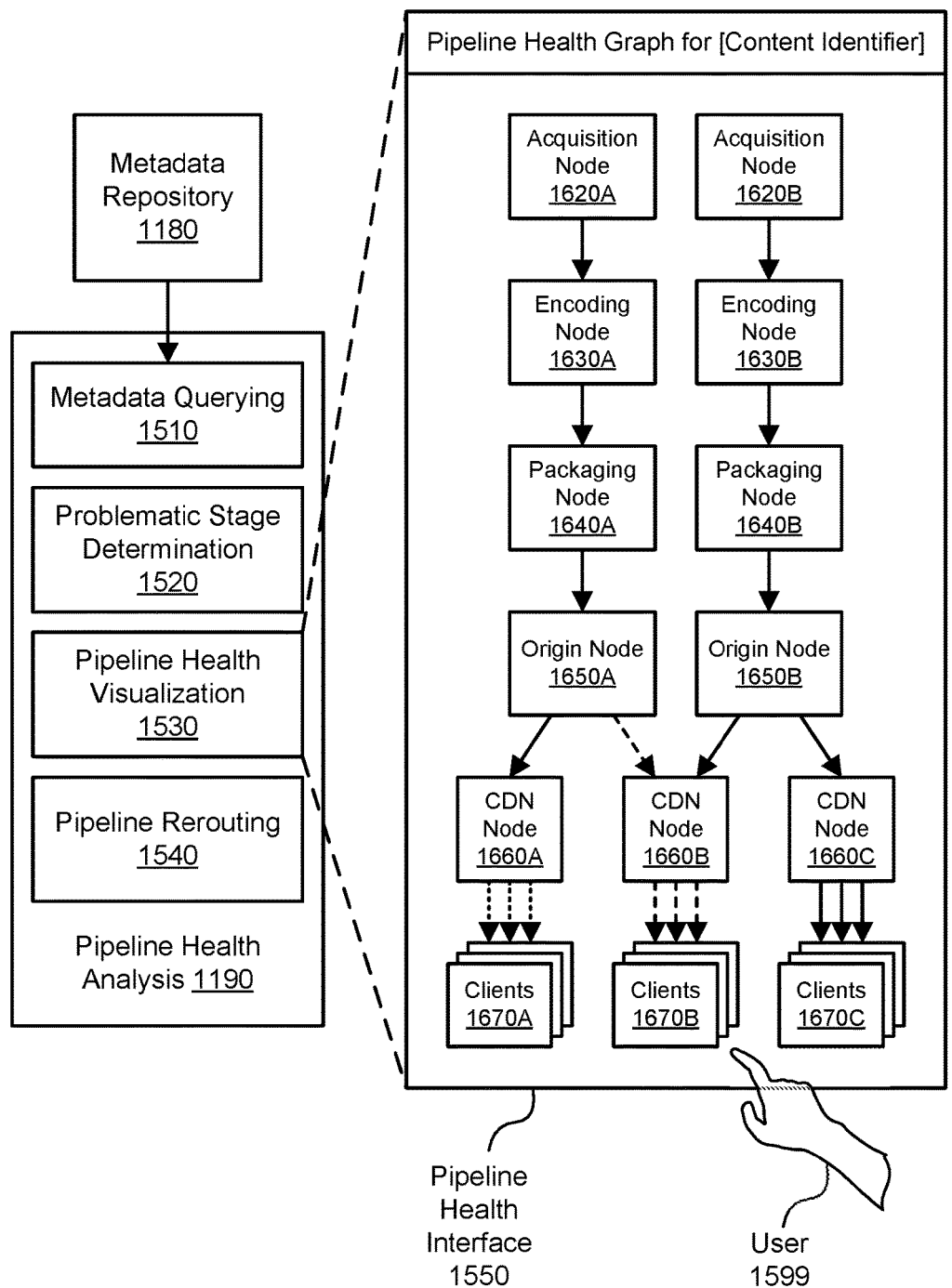
FIG. 12 illustrates a visualization of pipeline health for a particular media stream using a graph, according to one embodiment.

FIG. 12 illustrates a visualization of pipeline health for a particular media stream using a graph, according to one embodiment. Using the pipeline health analysis functionality 1190, the health of the pipeline may be monitored and/or visualized using the tracing metadata in the metadata repository 1180. The pipeline health analysis 1190 may include functionalities (e.g., components) for metadata querying 1510, problematic stage determination 1520, pipeline health visualization 1530, and pipeline rerouting 1540. The metadata querying 1510 may query the metadata repository 1180 for tracing metadata relevant to one or more particular media streams (e.g., as indicated by a content identifier), one or more particular elements or segments of a stream (e.g., as indicated by a segment identifier), one or more particular stages and/or sub-stages (e.g., as indicated by a stage identifier), and/or in a particular window of time (e.g., as indicated by timestamps in the tracing metadata). The metadata querying 1510 may be performed automatically (e.g., to perform period monitoring of pipeline health) or based on user input (e.g., in response to a report of problematic delivery of a media stream).

Using the functionality for problematic stage determination 1520, a problematic stage (e.g., a component that is responsible for a playback problem) may be determined based (at least in part) on analysis of the tracing metadata queried from the metadata repository 1180. The analysis may be performed either reactively or proactively. The reactive analysis may typically be performed after a report of problematic delivery (including problematic playback) is received, e.g., from a client (e.g., an end user operating a client computing device on which playback was attempted) or from another organization involved in the pipeline such as a broadcaster who generated the media content, a publisher of player software on the client device, a publisher of operating system software on the client device, a distributor of the client device, and so on. Problematic delivery may include playback that never begins, playback that begins but then stops prematurely, playback with sound but not video, playback with video but not sound, playback with low-quality or distorted video, playback with low-quality or distorted sound, playback with improperly synchronized sound and video, slow or choppy playback, and/or any other form of attempted playback that does not meet client expectations.

To perform proactive analysis, elements of the tracing metadata may periodically be retrieved from the database 1180 and analyzed to monitor the health of the pipeline. Using the tracing metadata, a graph or other visualization of a flow of the media stream may be generated using the pipeline health visualization functionality 1530. The visualization may be based on metadata for one content stream or set of segments or for many different content streams. When the visualization reflects many different content streams over a particular period of time, elements of the tracing data may be sampled so that all of the tracing metadata for the period of time need not be analyzed. The visualization may be presented in a pipeline health interface 1550 using any suitable user interface components such as one or more windows, and the interface may permit interaction by a user 1599. As shown in the example of FIG. 12, the visualization may show a tree-like structure representing the flow of segments for a particular content identifier. In the pipeline health graph for the content identifier, the various stages (e.g., components) are nodes and the connections between the stages are edges. To determine the connections between the nodes for segments or other elements of the media content associated with the content identifier, elements of the tracing metadata may be correlated by their common content identifier and their segment identifiers.

In the example of FIG. 12, acquisition nodes 1620A and 1620B may represent multiple components in the acquisition stage 1120; encoding nodes 1630A and 1630B may represent multiple components in the encoding stage 1130; packaging nodes 1640A and 1640B may represent multiple components in the packaging stage 1140; origin nodes 1650A and 1650B may represent multiple components in the origin server stage 1150; CDN nodes 1660A, 1660B, and 1660C may represent multiple components in the CDN stage 1160; and client nodes 1670A, 1670B, and 1670N may represent multiple components in the client or playback stage 1170. In one embodiment, a node in the interface 1550 may represent multiple components. For example, many client devices may be shown in aggregate form rather than as individual nodes, potentially with an indicator of the number of clients represented by the node. The pipeline health graph may show that one origin server such as node 1650A provides media to several downstream CDN servers such as CDN nodes 1660A and 1660B, and each CDN server has connections with many clients. The interface 1550 may represent a global view, e.g., of multiple regions, or it may instead be limited to a single region (e.g., based on input by the user 1599).

The pipeline health graph may include one or more visual indicators of the health of various portions of the pipeline. The graph may include visual indicators of problematic delivery of the media stream in one or more portions of the media delivery pipeline. For example, a green node or edge may represent proper functioning of a node or connection between nodes, a yellow node or edge may represent slow delivery (e.g., as indicated by analysis of timestamps for segments), and a red node or edge may indicate a total failure of functionality of the node or connection between stages. Other visual indicators may also be used, such as different types of icons or textual labels to indicate the varying health of nodes and/or different types of lines or textual labels to indicate the varying health of transitions between nodes. As shown in the example of FIG. 12, the dotted lines between CDN node 1660A and clients 1670A may indicate a slow delivery of segments, while the differently dotted lines between the origin node 1650A and CDN node 1660B and clients 1670B may indicate a total failure of delivery. In one embodiment, the user 1599 may click on a node to trace forwards or backwards for one or more segments or streams. In one embodiment, the user 1599 may click on a node to drill down into additional health analysis for a stage of the pipeline.

In one embodiment, a dashboard may be displayed with the interface 1550 to show metrics, graphs, or status updates related to the health of the pipeline (e.g., related to network latency between components); the metrics, graphs, and status updates may change over time as additional analysis is performed. The dashboard and interface 1550 may show historical pipeline health indicators as well as current health indicators. The pipeline health analysis 1190 may also trigger other configurable actions, such as sending alerts to relevant administrators or clients or other systems, switching to backup components or pipelines, and so on. As discussed above, the pipeline health analysis 1190 may be offered as a service to a plurality of clients. When the clients of the pipeline health analysis 1190 also manage components of pipeline stages, the clients may instrument those components to provide tracing metadata to the repository 1180 so that the metadata may be analyzed to provide suitable analysis for the clients.

Figure 13:
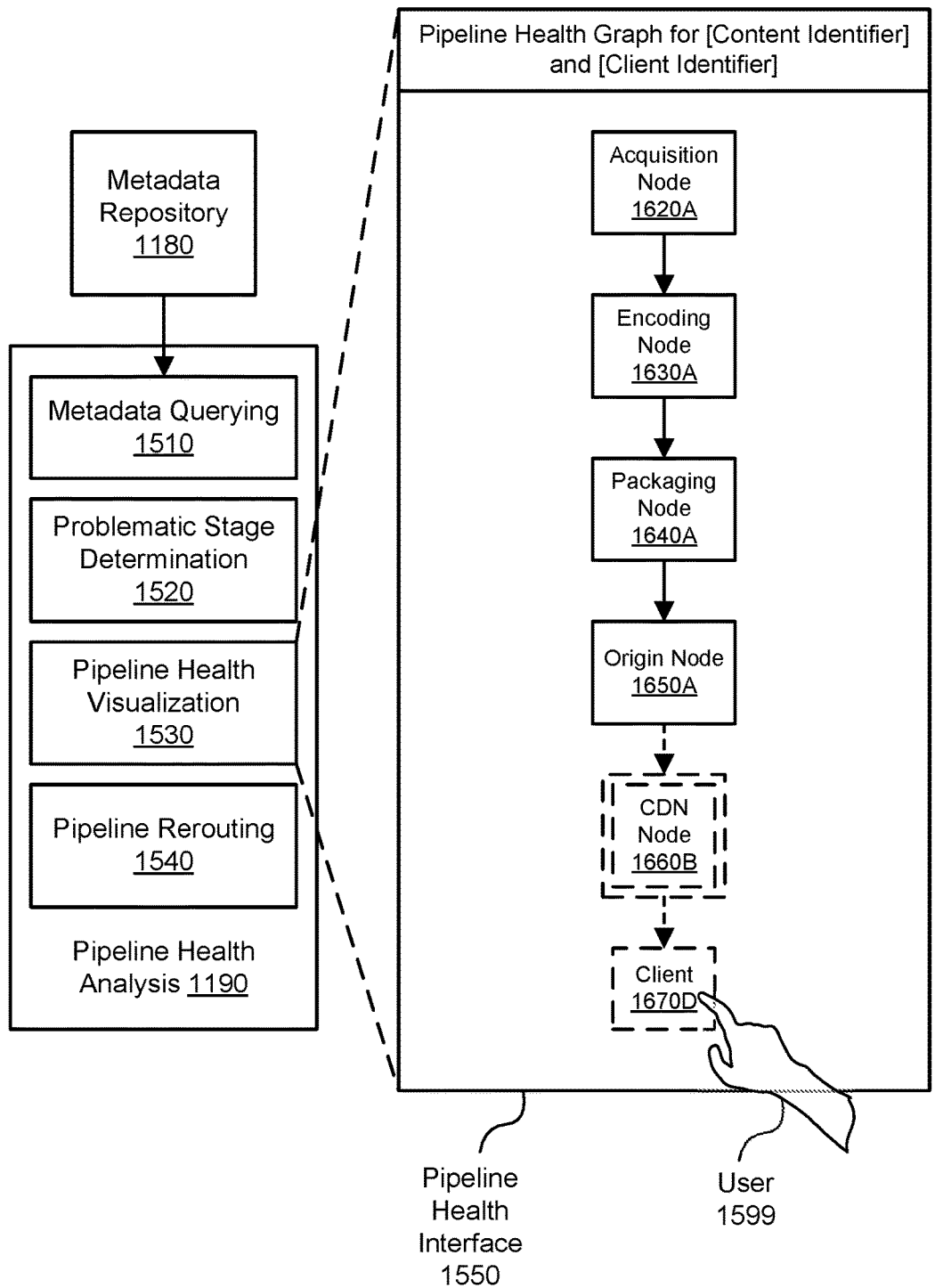
FIG. 13 illustrates a visualization of pipeline health for a particular client and particular media stream using a graph, including a depiction of a problematic stage, according to one embodiment.

FIG. 13 illustrates a visualization of pipeline health for a particular client and particular media stream using a graph, including a depiction of a problematic stage, according to one embodiment. To perform reactive analysis, relevant tracing metadata may be retrieved from the metadata repository or other centralized component. The relevant metadata may be associated with a particular content identifier as referenced in the report, e.g., indicating a particular channel or media asset from a library. The relevant metadata may also be associated with the particular client, e.g., with a connection between a CDN server and the particular client. The particular client may be identified in the metadata repository based on an IP address of the client device, an account identifier for the client with the media streaming service, a serial number or other unique identifier of the instance of player software on the client device, and/or any other suitable identifier of the client device itself. Even when media delivery has completely failed for a particular client, the client device may have sent a request for the media content, and tracing metadata may have been sent by the player software on the client device to the metadata repository 1180. The stage identifier for such elements of tracing metadata may specifically indicate the client device or client account of the user of the device. When the player requests access to streaming media, it may request a manifest file, and it may repeatedly request the manifest file again while the media content is streamed. The manifest file may indicate where to obtain the requested content (e.g., a CDN server) and how to calculate the right segment. In one embodiment, the manifest file may also provide an address to send tracing metadata generated by the player (e.g., to the metadata repository 1180).

In one embodiment, a graph or visualization of the flow of the media stream may be presented in a graphical user interface 1550, and the user 1599 may click on a node to trace a particular segment (or other portion) or stream forwards or backwards. For example, the user may click on a node 1670D representing the particular client device of a client associated with a report of problematic delivery. The relevant metadata may be analyzed to trace one or more segments or other elements of the media stream from the client device back to one or more upstream stages of the media delivery pipeline. The pipeline health graph in the interface 1550 may indicate the flow (or lack thereof) for a media stream represented by a particular content identifier through particular nodes, from the beginning of the pipeline to the end, if possible.

In one embodiment, one or more segments or other elements may be traced back until the problematic stage (or component thereof) is identified. The problematic stage may be the final stage at which a segment or portion was received or the stage immediately downstream from the final stage at which a segment or portion was sent. The tracing data at or beyond the problematic stage may be absent in the database for the relevant segments or elements, or tracing data at or beyond the problematic stage may indicate errors in the processing of the relevant segments or elements. As shown in the example of FIG. 13, the problematic stage may be determined to be the CDN node 1660B in the CDN stage 1160. The problematic stage (or component within a stage) may be highlighted with any suitable graphical or textual indicator, such as the double dotted line in FIG. 13.

Figure 14:
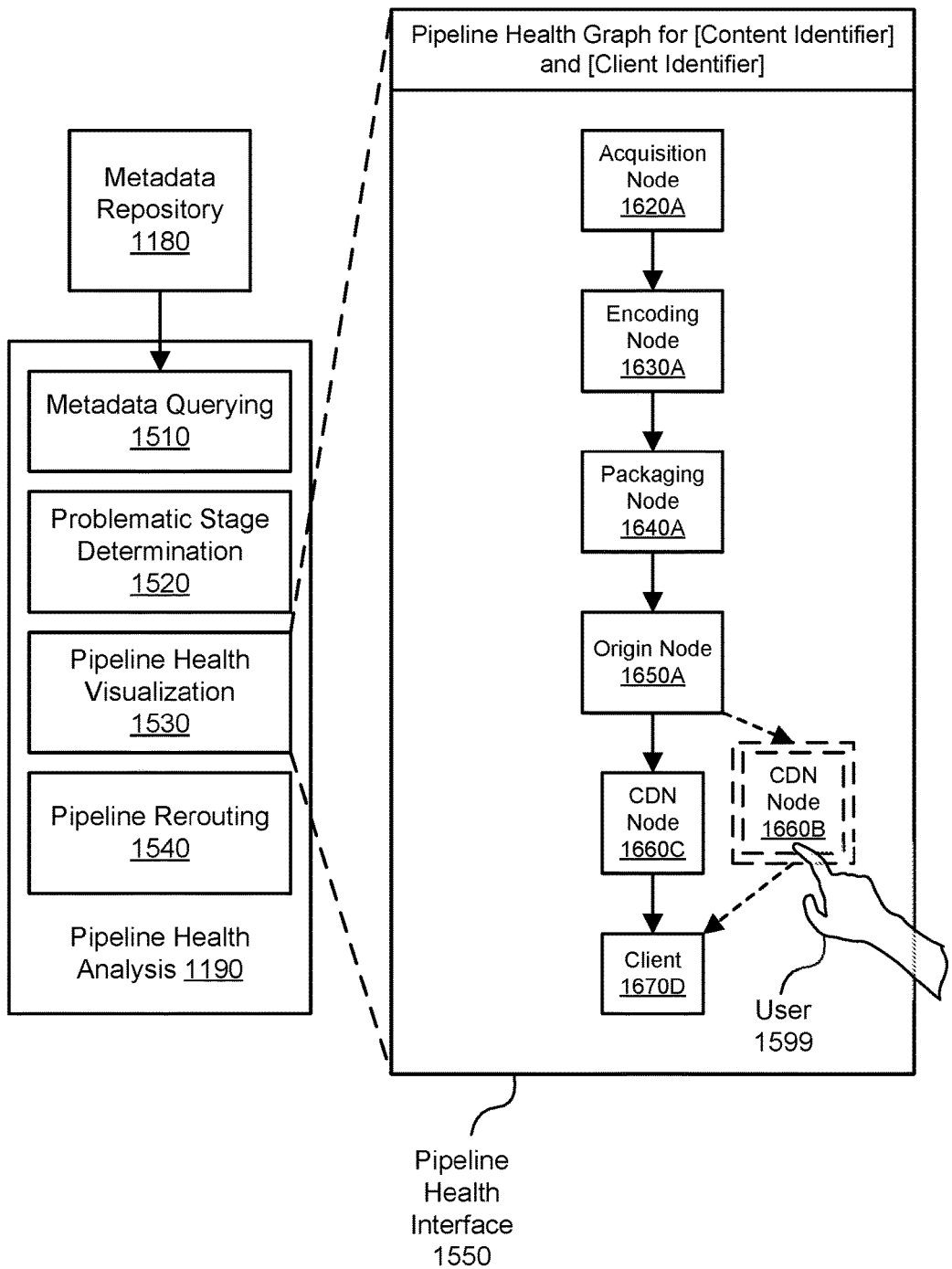
FIG. 14 illustrates the rerouting of a pipeline to bypass a problematic stage, according to one embodiment.

FIG. 14 illustrates the rerouting of a pipeline to bypass a problematic stage, according to one embodiment. Based on the pipeline health monitoring, additional steps may be taken, e.g., by administrators of the media streaming system 1100. For example, in a system with redundant components or paths, an administrator may bypass a component of a problematic stage by rerouting one or more streams to an alternative and properly functioning version of that component. As shown in the example of FIG. 14, using the pipeline rerouting functionality 1540, a user 1599 may reroute the flow of a particular content identifier through CDN node 1660C instead of problematic node 1660B to the client device 1670D. In one embodiment, the rerouting may be initiated by appropriate user input in the interface 1550, e.g., by moving the CDN node 1660B and replacing it with the CDN node 1660C. In some embodiments, the rerouting may be triggered and performed automatically or suggested to the user 1599 and then performed with user approval. In one embodiment, rerouting in this manner may involving sending a new manifest to the client device 1670D that, on receipt, causes the player software on the client to request segments from the CDN server represented by the node 1660C rather than the malfunctioning CDN server represented by the node 1660B. Rerouting through other stages such as the acquisition stage 1120, encoding stage 1130, or packaging stage 1140 may involve different techniques for reconfiguring the connections between components.

Figure 15:
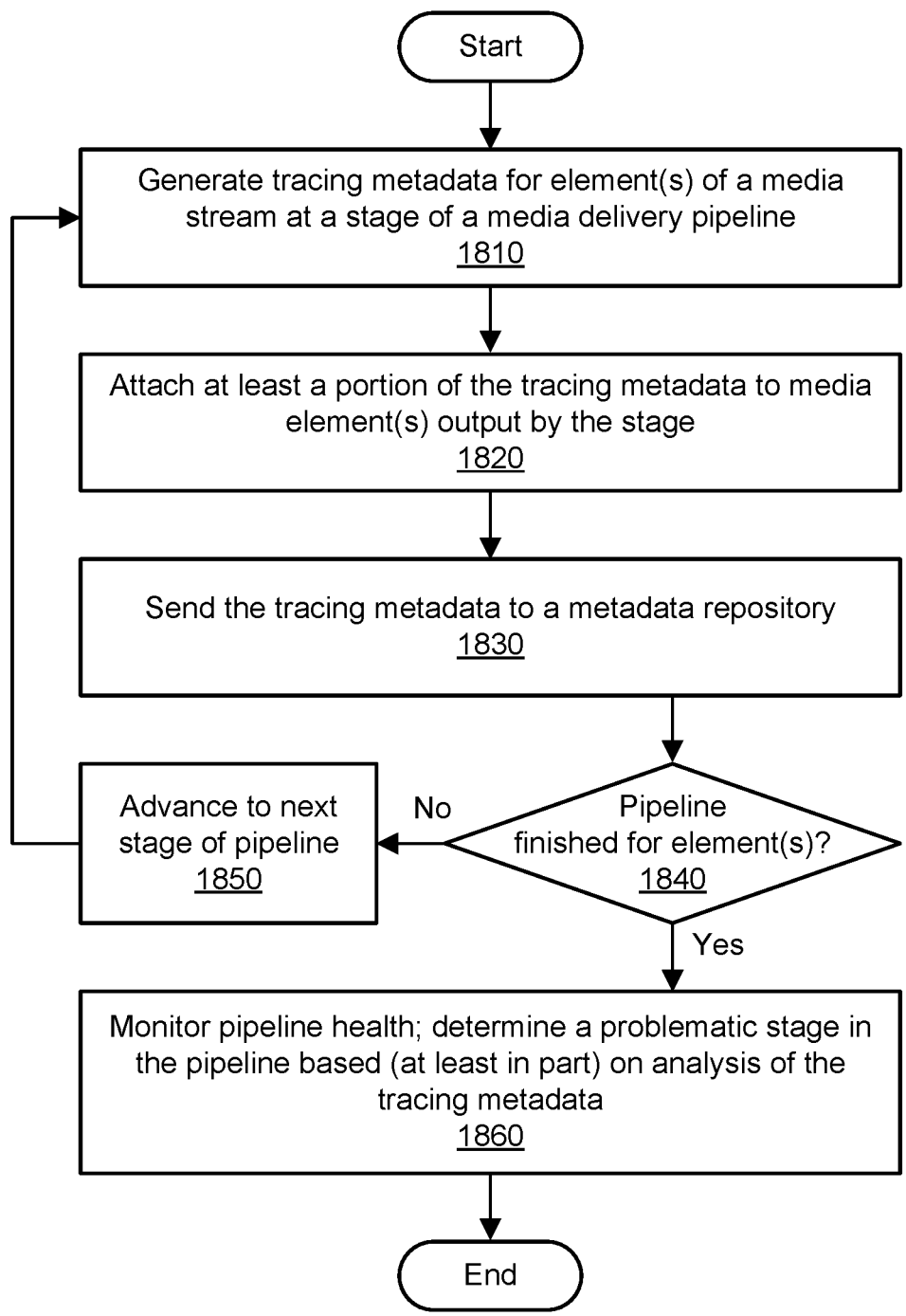
FIG. 15 is a flowchart illustrating a method for monitoring of media pipeline health using tracing, according to one embodiment.

FIG. 15 is a flowchart illustrating a method for monitoring of media pipeline health using tracing, according to one embodiment. The operations shown in FIG. 15 may be performed, at least in part, by a media streaming system. The media streaming system may implement a media delivery pipeline to stream media, such as video or audio, to client computing devices for playback on those devices. The media may represent live or prerecorded media content, typically associated with a particular channel or a media asset from a library of streamable media. The pipeline may include multiple stages; the stages may represent various transformations of the media and/or various distribution paths for the media (e.g., from device to device over the internet). Multiple computing devices may typically be used to implement the multi-stage pipeline. In some circumstances, more than one stage may be performed by the same computing device.

In one embodiment, the stages may include an acquisition stage, an encoding stage, and a packaging stage. At the acquisition stage, a signal representing the media may be acquired from a content provider, e.g., a broadcaster. The signal may be acquired by the media streaming system using any of several suitable transport mechanisms, including a camera feed, a microphone feed, an internet protocol (IP) connection, an asynchronous serial interface (ASI) connection, and so on. At the encoding stage, the media may be transformed into a particular video or audio format, e.g., using a particular codec. The encoding stage may include compression, or a separate compression stage may be used in the pipeline. Additionally, at the encoding stage, the media may be divided into segments or chunks of a fixed or variable size. For example, the media may be divided into segments of approximately ten seconds in length for delivery via HTTP over TCP/IP. At the packaging stage, the media may be packaged and multiplexed (or "muxed") for playback on particular playback software (referred to herein as a "player") and/or a particular type of client device (e.g., a particular category of smartphone). In one embodiment, additional stages of the pipeline may perform additional transformations of the media, such as encryption performed at an encryption stage, decoding performed at a decoding stage, framerate conversion performed at a framerate conversion stage, scaling performed at a scaling stage, and/or other types of image processing (e.g., color transformation) performed at an image processing stage. Alternatively, the additional transformations may be performed as a sub-stage of another stage such as the encoding stage.

In one embodiment, the stages may include an origin server stage (also referred to as an origin stage) and a content delivery network (CDN) stage. The pipeline may include one or more origin servers and a larger number of CDN servers. The origin server(s) may act as distribution points to the CDN servers. The CDN servers may be located closer to clients in terms of geography and/or network latency in order to provide efficient distribution of the media. A single origin server may provide a media stream to many CDN servers, and each CDN server may then respond to requests for media from many client devices. In some cases, such as for prerecorded media, the origin server may persistently store the media (or segments thereof) for an indefinite period of time, while the CDN servers may cache segments of the media for a more limited period of time. If a client requests particular content that is not available in the cache at a CDN server, then the CDN server may request the content from the origin server and then deliver the content to the requesting client. At the origin server stage, the media may be sent from the origin server to one or more CDN servers. If other stages such as the acquisition stage, encoding stage, and/or packaging stage are performed at the origin server, then the origin stage may include those stages or include corresponding sub-stages. However, it is also contemplated that the origin server stage may represent a distinct stage relative to the acquisition stage, encoding stage, and/or packaging stage. At the CDN stage, the media may be sent from a CDN server to a client device, e.g., as requested by the client device. In one embodiment, the stages may also include a playback stage that represents attempted playback by a player on a client device.

As shown in 1810, tracing metadata may be generated for one or more elements (e.g., segments) of a media stream at a particular stage of a media delivery pipeline. The tracing metadata may include a content identifier for the media stream. The content identifier may be globally unique within the context of the media streaming system. For example, if the media represents a live video stream, then the content identifier may indicate a particular channel. As another example, if the media represents prerecorded media content, then the content identifier may indicate a particular media asset from a library of streamable media. In one embodiment, the content identifier may be generated once (e.g., at the acquisition stage) and then propagated from stage to stage. The tracing metadata may include a segment identifier for each element or segment. For example, the segment identifiers may be ordered to reflect a sequence of the segments or other elements of the streaming media. In one embodiment, the segment identifier may be generated once (e.g., at the encoding stage or any stage at which the stream is broken into segments) and then propagated from stage to stage. The tracing metadata may include a stage identifier for the particular stage. The stage identifier may indicate the type of stage (e.g., acquisition, encoder, packager, origin, CDN, playback), potentially the sub-stage of the stage, and potentially the particular instance, component, or device within the stage that generates the metadata. The tracing metadata may include a timestamp. In one embodiment, the tracing metadata for a particular stage may be generated both when an element of media is received and also when an element of media is transferred to the next stage of the pipeline. In such an embodiment, the timestamps may differ for the first or "input" set of tracing metadata and the second or "output" set of tracing metadata at a particular stage. The tracing metadata may also include stage-specific elements, e.g., indicating errors that occur in any attempted operations at the stage. In various embodiments, tracing metadata may not be generated at every stage of the pipeline. However, analysis of the health of the pipeline will typically improve when tracing data is generated by a greater number of stages. The tracing metadata may be generated more than once within a stage, e.g., on input and output and/or at multiple sub-stages.

As shown in 1820, the tracing metadata (or at least a portion thereof) may be attached to the one or more elements of media before the elements are sent to the next stage of the pipeline. A segment or other element of media may said to be tagged with the tracing metadata for that segment. The content identifier and segment identifier may typically be generated once and then propagated from stage to stage, while the stage identifier may be omitted from the segment sent to the next stage or sent but then discarded at the next stage. As shown in 1830, the tracing metadata may also be sent to a metadata repository or other centralized component. The metadata repository may be maintained by the media streaming system using locally accessible storage resources or external storage resources such as a database service or system. The tracing metadata may be sent to the metadata repository substantially in real time, or at least without a significant delay. In one embodiment, the tracing data may be packaged and then sent when a sufficient amount (potentially for multiple different media streams) has accumulated at the stage. Typically, most stages that send tracing data to the metadata repository may do so without being prompted by the metadata repository or other centralized component of the media streaming system. In some embodiments, not every stage may send tracing metadata without being prompted by a centralized component. For example, the CDN servers may not generate or send tracing data automatically, but they may generate and periodically send logs (potentially on request) that may contain tracing metadata or that can otherwise be used to infer the health of media streams at the CDN stage.

As shown in 1840, it may be determined whether the pipeline is finished for the one or more elements of media. The pipeline may be considered finished when the element(s) are successfully played back on the client device or when an error occurs at a particular stage that stops the pipeline for a particular element or media stream. As shown in 1850, the method may advance to the next stage of the pipeline if the pipeline is not finished for the element(s). The stages in the pipeline may be ordered, and each stage may be configured to pass the tagged element(s) to one or more components of the next stage.

As shown in 1860, the health of the pipeline may be monitored using the tracing metadata. In one embodiment, a problematic stage (e.g., a component within the stage that is responsible for problematic delivery or problematic playback) may be determined based (at least in part) on analysis of the tracing metadata. The analysis may be performed either reactively or proactively. The reactive analysis may typically be performed after a report of problematic delivery is received, e.g., from a client (e.g., an end user operating a client computing device on which playback was attempted) or from another organization involved in the pipeline such as a broadcaster who generated the media content, a publisher of player software on the client device, a publisher of operating system software on the client device, a distributor of the client device, and so on. Problematic delivery may include playback that never begins, playback that begins but then stops prematurely, playback with sound but not video, playback with video but not sound, playback with low-quality or distorted video, playback with low-quality or distorted sound, playback with improperly synchronized sound and video, slow or choppy playback, and/or any other form of attempted playback that does not meet client expectations. The pipeline health analysis may be offered as a service to multiple clients.

To perform reactive analysis, relevant tracing metadata may be retrieved from the metadata repository or other centralized component. The relevant metadata may be associated with a particular content identifier as referenced in the report, e.g., indicating a particular channel or media asset from a library. The relevant metadata may also be associated with the particular client, e.g., with a connection between a CDN server and the particular client. The particular client may be identified in the metadata repository based on an IP address of the client device, an account identifier for the client with the media streaming service, a serial number or other unique identifier of the instance of player software on the client device, and/or any other suitable identifier of the client device itself. In one embodiment, a graph or visualization of the flow of the media stream may be presented in a graphical user interface, and a user may click on a node to trace a particular element or stream forwards or backwards. For example, the user may click on a node representing the particular client device of a client associated with a report of problematic playback. The relevant metadata may be analyzed to trace one or more elements of the media stream from the client device back to one or more upstream stages of the media delivery pipeline. In one embodiment, the elements may be traced back until the problematic stage is identified. The problematic stage may be the final stage at which an element of media was received or the stage immediately downstream from the final stage at which an element of media was sent. The tracing data at or beyond the problematic stage may be absent in the database for the relevant elements of media, or tracing data at or beyond the problematic stage may indicate errors in the processing of the relevant elements of media.

To perform proactive analysis, the tracing metadata may periodically be retrieved from the database and analyzed to monitor the health of the pipeline. Using the tracing metadata, a graph or other visualization of a flow of the media stream may be generated. The visualization may be based on metadata for one content stream or set of segments or for many different content streams. The visualization may show a tree-like structure in which the various stages (e.g., components) are nodes and the connections between the stages are edges. For example, the graph may show that one origin server provides media to several downstream CDN servers, and each CDN server has connections with many clients. In the visualization, many clients may be represented by a single component, potentially with an indicator of the number of clients. The graph or visualization may include one or more visual indicators of the health of various portions of the pipeline, potentially including visual indicators of problematic delivery of the media stream in one or more portions of the media delivery pipeline. For example, a green node or edge may represent proper functioning of a stage or transition between stages, a yellow node or edge may represent slow delivery (e.g., as indicated by analysis of timestamps for segments), and a red node or edge may indicate a total failure of functionality of the stage or transition between stages. Other visual indicators may also be used, such as different types of icons to indicate the varying health of stages and/or different types of lines to indicate the varying health of transitions between stages. In one embodiment, a user of the visualization may click on a node to trace forwards or backwards for one or more segments or streams. In one embodiment, a user of the visualization may click on a node to drill down into additional health analysis for a stage of the pipeline.

In this manner, the health and integrity of the media delivery pipeline may be monitored. Based on the monitoring, additional steps may be taken, e.g., by administrators of the media streaming system. For example, in a system with redundant components or paths, an administrator may bypass a problematic stage such as a packager or CDN server by rerouting one or more streams to an alternative and properly functioning version of that packager or CDN server. Based on the monitoring, additional steps may be automatically triggered and performed, e.g., to send alerts or switch to backup components.

Illustrative Computer System

In at least some embodiments, a computer system that implements a portion or all of one or more of the technologies described herein may include a computer system that includes or is configured to access one or more computer-readable media. FIG. 16 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a stream routing service, wherein the one or more computing devices are provisioned from a multi-tenant provider network, and wherein the stream routing service is configured to:
acquire a media stream over one or more input channels from a media source;
replicate the media stream to a plurality of subscriber components that have subscribed to the media stream including transmission of at least two redundant instances of the media stream along corresponding redundant portions of a particular transmission path from the media source to a particular one of the plurality of subscriber components, wherein at least one of the subscriber components is implemented using the multi-tenant provider network, and wherein the media stream is replicated to the subscriber components using unicast transmission to individual addresses of the subscriber components; and
discontinue replication of the media stream to one or more of the subscriber components that have unsubscribed from the stream.

2. The system as recited in claim 1, wherein the stream routing service is further configured to:
add a subscription to the media stream for an additional subscriber component, wherein the additional subscriber component is associated with an additional address; and
initiate replication of the media stream to the additional subscriber component, wherein the media stream is replicated to the additional address using unicast transmission.

3. The system as recited in claim 1, wherein the stream routing service is further configured to:
measure a quality of the media stream; and
send an alert when the quality of the media stream fails to meet a quality threshold.

4. A computer-implemented method, comprising:
performing, by one or more computing devices that implement a stream routing service, wherein the one or more computing devices are provisioned from a multi-tenant provider network:
acquiring a media stream over one or more input channels from a media source; and
replicating the media stream to a plurality of subscriber components that have subscribed to the media stream including transmitting at least two redundant instances of the media stream along corresponding redundant portions of a particular transmission path from the media source to a particular one of the plurality of subscriber components, wherein the media stream is replicated to the subscriber components using unicast transmission to individual addresses of the subscriber components.

5. The method as recited in claim 4, further comprising, by the one or more computing devices that implement the stream routing service:
   discontinuing replication of the media stream to one or more of the subscriber components that have unsubscribed from the stream.

6. The method as recited in claim 4, further comprising, by the one or more computing devices that implement the stream routing service:
   adding a subscription to the media stream for an additional subscriber component, wherein the additional subscriber component is associated with an additional address; and
   initiating replication of the media stream to the additional subscriber component, wherein the media stream is replicated to the additional address using unicast transmission.

7. The method as recited in claim 4, further comprising, by the one or more computing devices that implement the stream routing service:
   measuring a quality of the media stream; and
   sending an alert when the quality of the media stream fails to meet a quality threshold.

8. The method as recited in claim 4, further comprising, by the one or more computing devices that implement the stream routing service:
   determining quality metrics for the media stream for each of the input channels; and
   selecting one of the input channels for replication to the subscriber components based on the quality metrics.

9. The method as recited in claim 4, further comprising, by the one or more computing devices that implement the stream routing service:
   performing error correction for the media stream prior to replication to the subscriber components.

10. The method as recited in claim 4, further comprising, by the one or more computing devices that implement the stream routing service:
    performing encryption or decryption on the media stream prior to replication to the subscriber components.

11. The method as recited in claim 4, further comprising, by the one or more computing devices that implement the stream routing service:
    selecting a program from a plurality of programs in the media stream for replication to the subscriber components.

12. The method as recited in claim 4, further comprising:
    performing, by one or more additional computing devices that implement an additional instance of the stream routing service:
       acquiring the media stream over the one or more input channels from the media source; and
       replicating the media stream to the plurality of subscriber components, wherein the media stream is replicated to the subscriber components using unicast transmission to the individual addresses of the subscriber components, and wherein the media stream is acquired and replicated using at least two instances of the stream routing service, including the additional instance.

13. The method as recited in claim 4, wherein the subscriber components include one or more encoders, and wherein at least one of the subscriber components is implemented using the multi-tenant provider network.

14. A non-transitory computer-readable storage medium storing program instructions computer-executable to perform:
    acquiring a media stream over a plurality of input channels from a media source, wherein the media stream is acquired using one or more compute instances of a multi-tenant provider network;
    replicating the media stream to a plurality of subscriber components that have subscribed to the media stream including transmitting at least two redundant instances of the media stream along corresponding redundant portions of a particular transmission path from the media source to a particular one of the plurality of subscriber components, wherein the media stream is replicated to the subscriber components using unicast transmission to individual addresses of the subscriber components; and
    discontinuing replication of the media stream to one or more of the subscriber components that have unsubscribed from the stream.

15. The non-transitory computer-readable storage medium as recited in claim 14, wherein the program instructions are further computer-executable to perform:
    adding a subscription to the media stream for an additional subscriber component, wherein the additional subscriber component is associated with an additional address; and
    initiating replication of the media stream to the additional subscriber component, wherein the media stream is replicated to the additional address using unicast transmission.

16. The non-transitory computer-readable storage medium as recited in claim 14, wherein the program instructions are further computer-executable to perform:
    measuring a quality of the media stream; and
    sending an alert when the quality of the media stream fails to meet a quality threshold.

17. The non-transitory computer-readable storage medium as recited in claim 14, wherein the program instructions are further computer-executable to perform:
    determining quality metrics for the media stream for each of the input channels; and
    selecting one of the input channels for replication to the subscriber components based on the quality metrics.

18. The non-transitory computer-readable storage medium as recited in claim 14, wherein the plurality of subscriber components include one or more encoders, one or more media analyzers, one or more storage components, or a combination thereof.

19. The non-transitory computer-readable storage medium as recited in claim 14, wherein the program instructions are further computer-executable to perform:
    performing encryption or decryption on the media stream prior to replication to the subscriber components.

20. The non-transitory computer-readable storage medium as recited in claim 14, wherein the program instructions are further computer-executable to perform:
    selecting a program from a plurality of programs in the media stream for replication to the subscriber components.

* * * * *